(12) United States Patent
Rastegar et al.

(10) Patent No.: US 11,588,195 B2
(45) Date of Patent: Feb. 21, 2023

(54) METAL-OXYGEN PRIMARY RESERVE BATTERIES FOR MUNITIONS AND THE LIKE APPLICATIONS

(71) Applicant: Omnitek Partners LLC, Ronkonkoma, NY (US)

(72) Inventors: Jahangir S Rastegar, Stony Brook, NY (US); Javier Alvare, Sandy, UT (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 18 days.

(21) Appl. No.: 17/397,877

(22) Filed: Aug. 9, 2021

(65) Prior Publication Data

US 2022/0052398 A1 Feb. 17, 2022

Related U.S. Application Data

(60) Provisional application No. 63/064,325, filed on Aug. 11, 2020.

(51) Int. Cl.
| | |
|---|---|
| *H01M 12/06* | (2006.01) |
| *H01M 4/38* | (2006.01) |
| *H01M 4/583* | (2010.01) |
| *H01M 4/02* | (2006.01) |

(52) U.S. Cl.
CPC .......... *H01M 12/06* (2013.01); *H01M 4/382* (2013.01); *H01M 4/583* (2013.01); *H01M 2004/021* (2013.01); *H01M 2300/0017* (2013.01)

(58) Field of Classification Search
CPC ...... H01M 12/06; H01M 4/382; H01M 4/583; H01M 2300/0017; H01M 4/96; H01M 6/38; H01M 50/1385
See application file for complete search history.

(56) References Cited

U.S. PATENT DOCUMENTS

| | | | |
|---|---|---|---|
| 10,050,291 B2 * | 8/2018 | Lee ........................ | H01M 10/46 |
| 2016/0149278 A1 * | 5/2016 | Woehrle ................ | H01M 12/02 |
| | | | 429/405 |

* cited by examiner

*Primary Examiner* — Stewart A Fraser

(57) ABSTRACT

A metal-gas battery including: a battery core, gas container and a movable member. The battery core including a metal anode; a non-aqueous electrolyte; a porous cathode; and terminals for providing electrical power from the battery core. The gas container being configured to hold a pressurized gas. The movable member being configured to be movable from a non-activated position in which the pressurized gas in the container is sealed from entering the porous cathode and an activated position in which the pressurized gas flows into the porous cathode to activate the battery core.

23 Claims, 18 Drawing Sheets

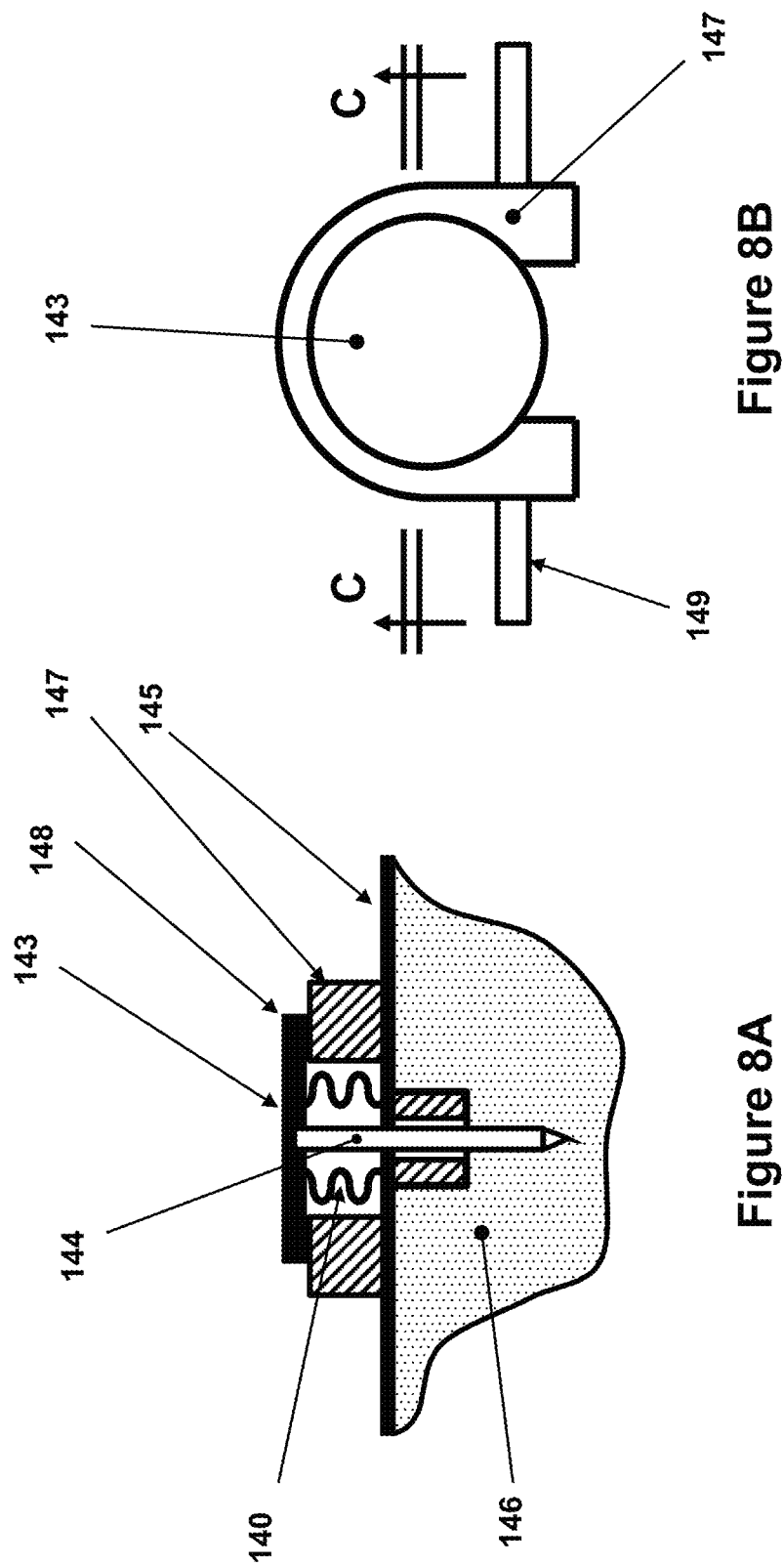

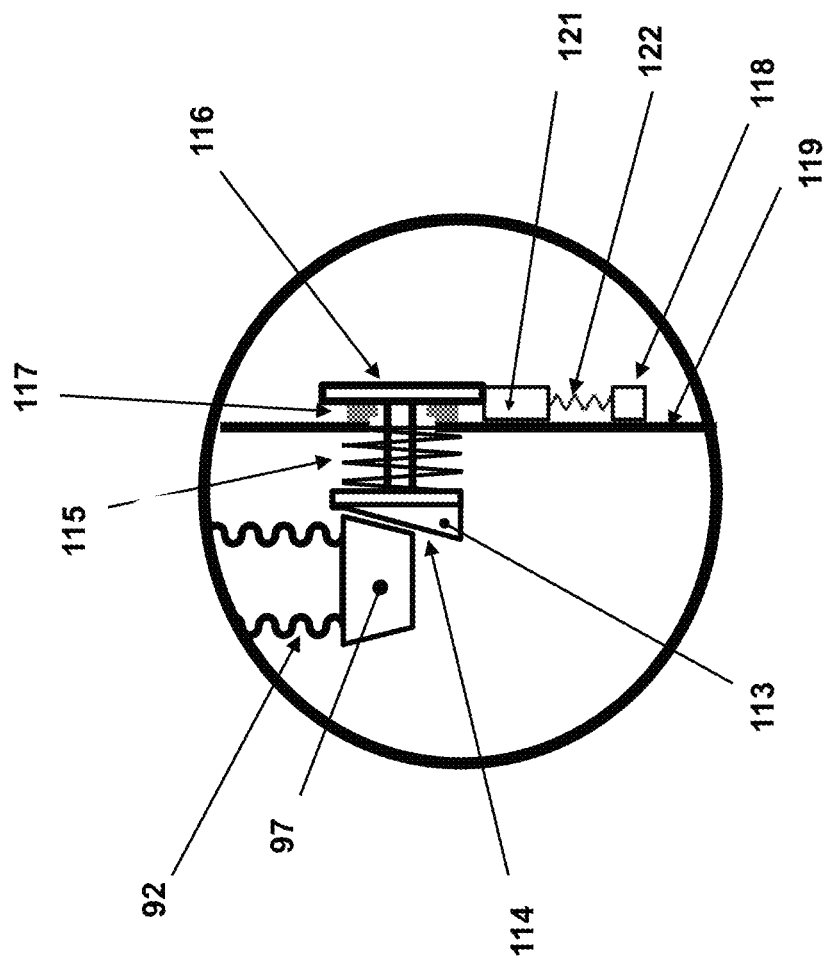
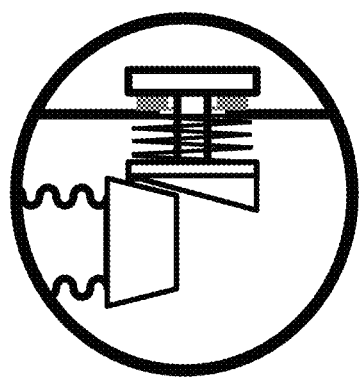
Figure 13B
Figure 13A

METAL-OXYGEN PRIMARY RESERVE BATTERIES FOR MUNITIONS AND THE LIKE APPLICATIONS

CROSS-REFERENCE TO RELATED APPLICATION

This application claims the benefit of U.S. Provisional Application No. 63/064,325, filed on Aug. 11, 2020, the entire contents of which is incorporated herein by reference.

BACKGROUND

Field

The present invention relates generally to reserve power sources for munitions and other similar applications; and more particularly to Lithium-oxygen reserve batteries and methods of their activation for use in gun-fired munitions, sub-munitions, mortars, and the like. The Lithium-oxygen batteries may be activated and deactivated as required to satisfy the system power requirement and to maximize the power source run time.

Prior Art

Reserve batteries of the electrochemical type are well known in the art for a variety of uses where storage time before use is extremely long. Reserve batteries are in use in applications such as batteries for gun-fired munitions including guided and smart, mortars, fusing mines, missiles, and many other military and commercial applications. The electrochemical reserve-type batteries can in general be divided into two different basic types.

The first type includes the so-called thermal batteries, which are to operate at high temperatures. Unlike liquid reserve batteries, in thermal batteries the electrolyte is already in the cells and therefore does not require a release and distribution mechanism such as spinning. The electrolyte is dry, solid and non-conductive, thereby leaving the battery in a non-operational and inert condition. These batteries incorporate pyrotechnic heat sources to melt the electrolyte just prior to use in order to make them electrically conductive and thereby making the battery active. The most common internal pyrotechnic is a blend of Fe and $KClO_4$. Thermal batteries utilize a molten salt to serve as the electrolyte upon activation. The electrolytes are usually mixtures of alkali-halide salts and are used with the Li(Si)/$FeS_2$ or Li(Si)/$CoS_2$ couples. Some batteries also employ anodes of Li(Al) in place of the Li(Si) anodes. Insulation and internal heat sinks are used to maintain the electrolyte in its molten and conductive condition during the time of use.

The second type includes the so-called liquid reserve batteries in which the electrodes are fully assembled for cooperation, but the liquid electrolyte is held in reserve in a separate container until the batteries are desired to be activated. In these types of batteries, since there is no consumption of the electrodes under these circumstances, the shelf life of the batteries is essentially unlimited. The battery is activated by transferring the electrolyte from its container to the battery electrode compartment (hereinafter referred to as the "battery cell").

A typical liquid reserve battery is kept inert during storage by keeping the aqueous electrolyte separate in a glass or metal ampoule or in a separate compartment inside the battery case. The electrolyte compartment may also be separated from the electrode compartment by a membrane or the like. Prior to use, the battery is activated by breaking the ampoule or puncturing the membrane allowing the electrolyte to flood the electrodes. The breaking of the ampoule or the puncturing of the membrane is achieved either mechanically using certain mechanisms or by the high-G firing setback shock. In these batteries, the projectile spin or a wicking action of the separator is generally used to transport the electrolyte into the battery cells.

In recent years, there have been a number of advancements in reserve battery technologies. Among these advances are superhydrophobic nanostructured materials, bimodal lithium reserve battery, and ceramic fiber separator for thermal batteries. In one liquid reserve battery technology under development, "superhydrophobic nanostructured material" is used in a honeycomb structure to keep the electrolyte separated from the battery cell. "Electrowetting" is achieved by the application of a trigger voltage pulse. The electrolyte can then penetrate the honeycomb structure and come into contact with the electrodes, thereby making the cell electrochemically active.

The currently available liquid reserve and thermal batteries of all types and configurations and those that are known to be under development suffer from several basic shortcomings for many current and future munitions applications, including the following:

1. The main shortcoming of currently available liquid reserve batteries of all types and configurations is their very poor performance at low temperatures, usually below −25 deg. F. and for becoming almost non-functional at lower temperatures. In most munition applications, however, the batteries are required to be operational at significantly lower temperatures of −40 deg. F. and sometimes lower, and sometimes after storage at temperatures as low as −65 deg. F.
2. Another shortcoming of all currently available liquid reserve batteries is activation at very low temperatures.
3. Another shortcoming of all currently available liquid reserve batteries is their relatively slow rise time, particularly at low temperatures. Researchers have, however, attempted to minimize this shortcoming by, for example, by injecting pressurized electrolyte into the battery cells; using wicks to increase the electrolyte diffusion rate; utilize spin and/or setback to move electrolyte into the battery cell to increase; etc. These methods have improved the liquid reserve battery rise time to but not significantly enough to address all applications and in many applications such solutions are not even practical.
4. Thermal reserve batteries do not have low temperature issues and can be activated and produce power at even below −100 deg. F. However, thermal batteries have very short run time, particularly for smaller sizes that are required in gun-fired munitions in which the run time might become even less than one minute.
5. Currently available liquid reserve and thermal reserve batteries have both the shortcoming of not being able to be reverted to their reserve state once they have been activated. This capability is highly desirable for many munitions and other emergency powering applications in which different amounts of electrical power may be needed at different times with periods in between, which might be very long, during which no power is needed.

In current lithium metal-based liquid reserve batteries, such as lithium thionyl chloride and lithium graphite fluoride, rely on the supply of a liquid electrolyte to the cathode electrode at the time of activation. This requires the storage of the liquid electrolyte separately from the rest of the battery mostly inside glass ampoules, which are broken in the process of activation. The liquid electrolytes have also been stored in metal bellows with provided membranes or have been separated from the battery core by certain membranes, which in either case is ruptured during the activation process. In general, the activation process is relatively slow, resulting in relatively slow power rise time, and face distribution issues inside the battery core, particularly at low temperatures.

There are only a few battery chemistries that have the potential chance of achieving significantly higher energy density than is currently available for reserve batteries. The main candidates for achieving significantly higher energy density for reserve batteries are metal-air based battery systems, FIG. 1. The most common type of commercial metal-air battery utilizes zinc-air chemistry and has a practical specific energy of ~370 Wh/kg, while this battery chemistry has a theoretical specific energy of 1350 Wh/kg. In addition to zinc-air batteries, aluminum-air batteries are also available in the commercial market, although only in a limited fashion. Aluminum-air batteries have a much greater theoretical specific energy (8140 Wh/kg) and although they currently have a practical specific energy of ~350 Wh/kg but have the potential for significant specific energy improvement. The highest theoretical specific energy for a metal-air battery chemistry is lithium-air at 11,500 Wh/kg giving it and aluminum-air batteries the best potential to realize significantly higher specific energy values for reserve batteries as compare to the currently available reserve batteries.

In a primary Metal-Oxygen battery, oxygen gas reacts with the metal ions on the porous carbon substrate cathode. There is a clear advantage of Metal-Oxygen batteries over traditional liquid primary reserve batteries in that the activation mechanism of the former does not require the injection of a liquid electrolyte but of oxygen gas. While Metal-Oxygen batteries do still require of a liquid electrolyte to transport the metal ions from the metal anode to the cathode electrode during battery discharge, the liquid electrolyte on its own does not activate the battery and hence it can then be added to the battery during the assembly process. Since the activation of the battery relies on the transport of a gas, and not of a liquid, into the porous cathode material, the rate of activation for Metal-Oxygen batteries is much faster and more efficient than that of the traditional liquid reserve batteries. If the metal used in the battery is lithium, and since the theoretical energy density of Li-Oxygen batteries is the highest of all lithium metal batteries (11,500 Wh/kg of lithium, excluding the oxygen mass), therefore primary reserve Li-Oxygen batteries have the potential to be significantly more energy dense than the traditional liquid reserve batteries.

A primary reserve battery based on Metal-Oxygen chemistry is activated by allowing oxygen gas to enter the porous cathode material. The metal in the battery can be one of those indicated in FIG. 1 and more, i.e., lithium, sodium, potassium zinc, magnesium, calcium, aluminum, iron, silicon, germanium, and tin.

A lithium-air battery has three main components: an anode, an electrolyte, and a cathode, FIG. 2. The anode is the source of lithium-ions and can be lithium metal. The electrolytes can be e.g., aqueous, aprotic (organic), mixed aqueous/aprotic, or solid state, each having its own advantages and disadvantages. The lithium-air battery also includes the cathode, which as is stated in the name of this technology, is air—or more accurately stated, the oxygen in the air. Being that the cathode materials is supplied by the oxygen in the air the mass of the cathode is very small, thus imparting a significant savings in the mass of the overall system and the theoretical specific energy. However, the oxygen still needs a platform for the electrochemical reactions of the battery to take place. These reactions can be supported by the use of porous carbon materials that are in some cases coated with a catalytic metal oxide, such as $MnO_2$ or $CoO_2$.

Reserve Lithium-air batteries are primary batteries. In general, the lithium air battery includes a lithium metal anode electrode capable of generating lithium ions during discharge and a cathode containing oxygen in the air as a cathode active material, and a lithium ion conductive medium (electrolyte) is provided between the cathode and anode. The lithium air primary battery has a theoretical energy density of 3000 Wh/kg or more, which corresponds to about 10 times energy density of a lithium ion battery. In addition, the lithium air battery may be eco-friendly and provide improved stability as compared to the lithium ion battery.

SUMMARY

Therefore, reserve batteries based on Lithium-air battery operation mechanism would provide significantly higher energy density than is available from all current liquid reserve batteries. Such reserve batteries must, however, be suitable for use in gun-fired and other munitions, for example, should be capable of withstanding high firing shock loadings and have shelf life of over 20 years.

It is also highly desirable that such higher density reserve batteries be capable of being activated and deactivated, i.e., reverted to its reserve state, in order to significantly increase the run time of the battery when the power demand varies significantly over time, particularly when for very long periods of times very small or no power may be needed for the battery to provide.

A need therefore exists for reserve batteries that can provide electrical energy to munitions for relatively long run time that is currently possible with thermal batteries and liquid reserve batteries.

A need also exists for reserve batteries that can be activated and deactivated and reverted to their pre-activation reserve state.

In particular, there is a need for reserve batteries with shelf life of over 20 years that can provide power to low power electronics over long periods of times that could extend for days, weeks and even months. It is appreciated by those skilled in the art that to achieve such long shelf life, the battery components can be hermetically sealed inside the reserve battery housing.

A need also exists for reserve batteries with significantly higher energy density that the currently available reserve batteries.

A need also exists for reserve batteries that can be activated very rapidly to provide electrical energy.

Such reserve batteries can be initiated as a result of the munitions firing using inertial igniters, such as those disclosed in U.S. Pat. Nos. 7,437,995; 7,587,979; 7,587,980; 7,832,335 and 8,061,271 and U.S. patent application Ser. Nos. 12/774,324; 12/794,763; 12/835,709; 13/180,469; 13/207,280 and 61/551,405, the full disclosure of each of which being incorporated herein by reference, or piezoelectric-based inertial igniters, such as those disclosed in U.S. Pat. No. 8,024,469 and U.S. patent application Ser. Nos. 13/186,456 and 13/207,355, the full disclosure of each of which being incorporated herein by reference) or other electrical initiators. The piezoelectric-based inertial igniters, such as those that can provide relatively long initiation delay, can delay or eliminate the time period in which the battery is subjected to high acceleration/deceleration levels. The reserve battery may also be activated following launch when its power is needed, which may in certain cases be long after launch and even after landing. The initiation devices to be used can also be configured to operate safely by differentiating all-fire and various no-fire events, such as accidental drops and vibration and impact during transportation and loading and even nearby explosions. The task of differentiating all-fire conditions from no-fire conditions can be performed without the use of external acceleration sensors and the like, and/or the use of external power sources.

An objective is to provide new types of reserve batteries (power sources) that can operate efficiently at low temperatures and that can be activated and brought to operational power levels rapidly. Such reserve batteries can also be fabricated in small sizes suitable for use in small and medium caliber munitions, sub-munitions and the like.

Another objective is to provide new types of reserve batteries that can be activated and deactivated, i.e., reverted to their reserve battery state, as needed for powering the intended electrical energy consuming devices.

Another objective is to provide new types of reserve batteries and methods of providing smart and programmable power systems that can maximize the overall efficiency of the power system and thereby minimize the total volume of the power system, such as for munitions applications.

Another objective is to provide new types of reserve batteries that can be rapidly activated using electrical or inertial activation devices to provide electrical energy as needed and become deactivated, i.e., be reverted to its reserve state, when it does not have to provide electrical energy, to extend its useful service period of time as much as possible.

To ensure safety and reliability, the reserve batteries can withstand and not initiate during acceleration events which may occur during manufacture, assembly, handling, transport, accidental drops, etc. Additionally, once under the influence of an acceleration profile indicating firing of the ordinance, i.e., an all-fire condition (with or without a programmed delay period), the reserve battery should initiate with high reliability.

The disclosed reserve power sources can be provided with hermetically sealed packaging. As such, the disclosed reserve power sources would be capable of readily satisfying most munitions requirement of 20-year shelf life requirement and operation over the military temperature range of −65 to 165 degrees F., while withstanding high G firing accelerations.

In many applications, the reserve battery can provide full or close to full power very short time after initiation. This capability can be challenging when the reserve battery is at very low temperatures, such as the aforementioned −65 degrees F.

There is a clear advantage for the development of reserve batteries that can use Lithium-air primary battery technologies over liquid reserve batteries and thermal batteries as was previously described. For the case of liquid reserve batteries, the main advantages include the elimination of separate liquid electrolyte storage and a significant increase in the amount of electrical energy that can become available per unit volume, which are of particular importance in applications such as munitions. While Li-Air batteries may still require a liquid electrolyte to transport the lithium ions from the lithium metal anode to the cathode electrode during battery discharge, the liquid electrolyte on its own does not activate the battery and hence it can then be added to the battery during the battery assembly process. In addition, since activation of the battery relies on the transport of a gas and not of a liquid into the porous cathode material, the rate of activation for Li-Air batteries is much faster and efficient than that of the traditional liquid reserve batteries. Moreover, since the theoretical energy density of Li-Air batteries is the highest of all lithium metal batteries, Li-Air based reserve batteries have the potential to be capable of providing significantly more electrical energy than currently available liquid reserve batteries can provide.

Accordingly, methods and apparatus are provided for reserve batteries that are based on Lithium-Air technology and have long shelf life of over 20 years.

Furthermore, methods and apparatus are provided for reserve batteries that can be activated and deactivated and reverted to their reserve state on command or via a self-regulated mechanism.

Furthermore, methods and apparatus are provided for activation of reserve batteries when subjected to a prescribed gun or the like firing accelerations as described by a shock loading level and its duration and that it does not activate under prescribed accidental shock loadings such as drop over hard surfaces or due to transportation vibration and other similar (non-activation) events.

Furthermore, methods and apparatus are provided for activation of reserve batteries based on external commands, which can be initiated based on a pre-programmed plan or a sensory or certain event detection or the like.

It is appreciated by those skilled in the art that since Lithium-Oxygen batteries has the potential of providing reserve batteries with the highest energy density, hereinafter the different embodiments are described herein in terms of Lithium-Oxygen reserve batteries without any intention of limiting the disclosed embodiments to Lithium metal and in general, any other metal, including those disclosed above may be used to replace the Lithium metal as the anode.

BRIEF DESCRIPTION OF THE DRAWINGS

These and other features, aspects, and advantages of the apparatus of the present invention will become better understood with regard to the following description, appended claims, and accompanying drawings where:

FIGS. 8A and 8B illustrate a method of providing the Lithium-Oxygen reserve batteries with external bellow activation mechanisms with "safety pin" to prevent for accidental activation.

FIG. 13A illustrates a blow-up view "B" of the oxygen gas valve of the Lithium-oxygen reserve battery embodiment of FIG. 12.

FIG. 13B illustrates an alternative oxygen gas valve for the Lithium-oxygen reserve battery embodiment blow-up "B" of FIG. 12 configured for activation when subjected to a prescribed acceleration profile and staying activated.

DETAILED DESCRIPTION

Figure 2:
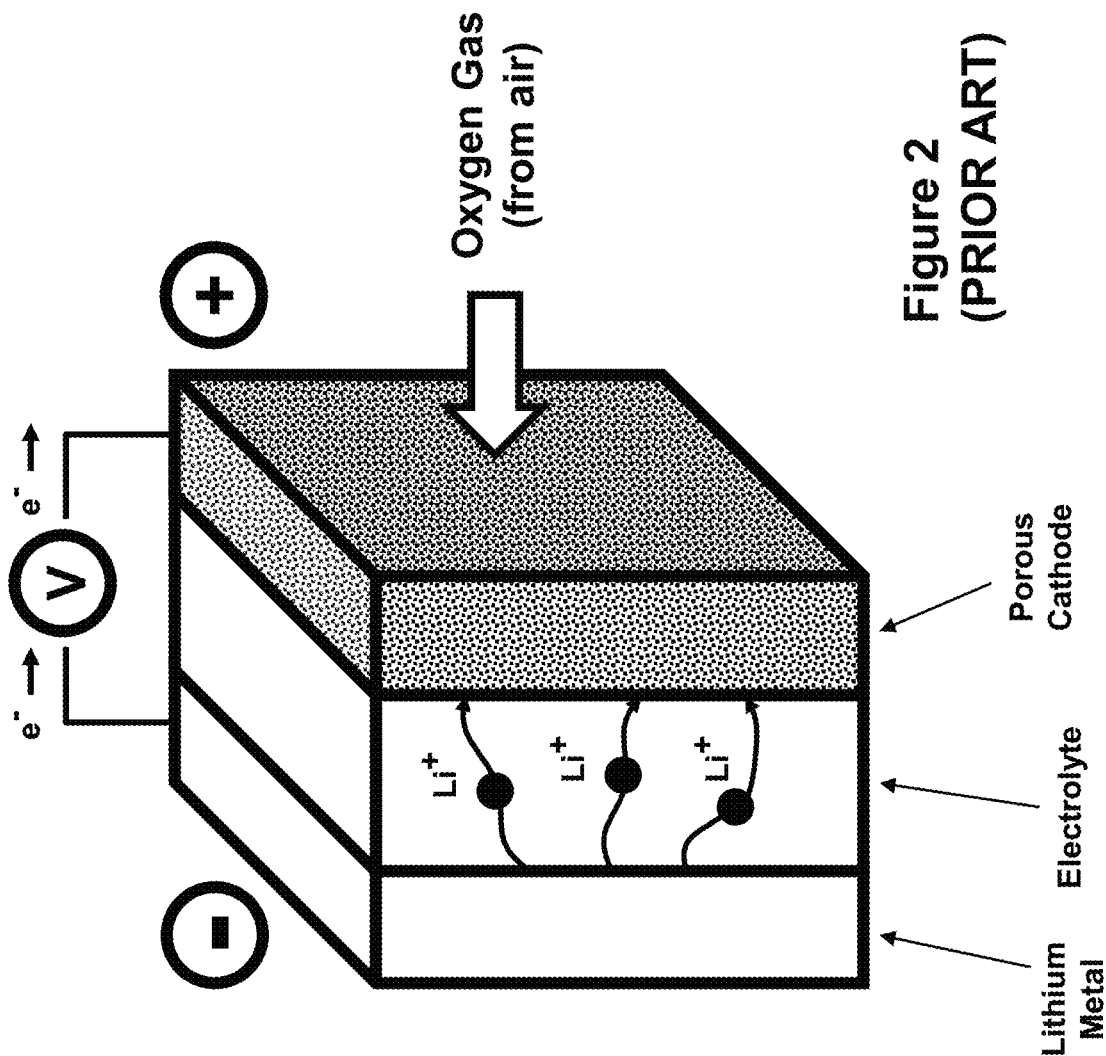
FIG. 2 illustrates basic components of a Lithium-Air battery of the prior art.

The present Li-Oxygen reserve batteries are described using the basic Li-Oxygen reserve battery embodiment 10 shown in the cross-sectional schematic of FIG. 2. As discussed above, such Li-Oxygen reserve battery is presented by way of example and without any intention of limiting the disclosed embodiments to Lithium metal and in general, any other metal, including those disclosed above may be used to replace the Lithium metal as the anode.

Figure 3:
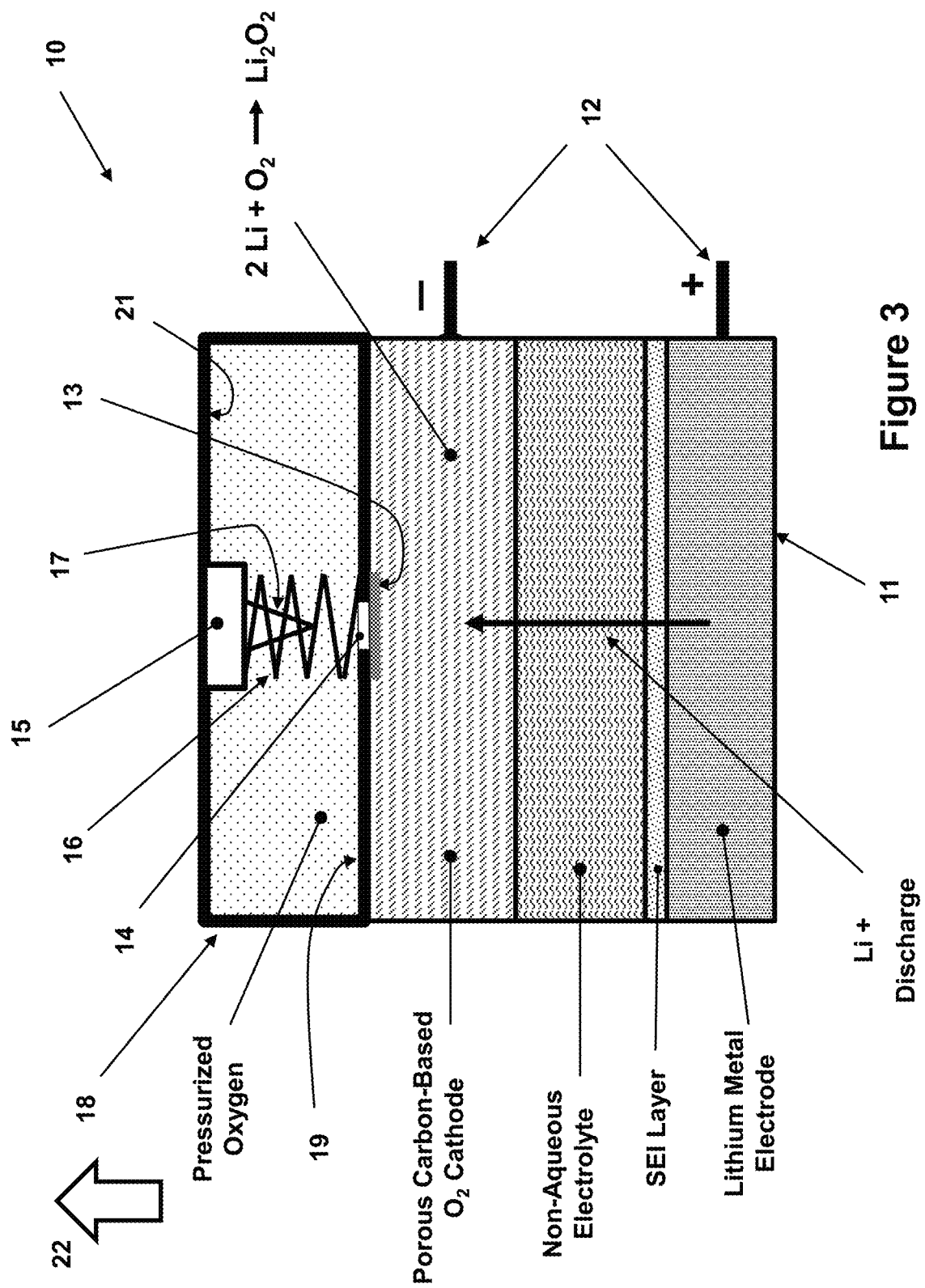
FIG. 3 illustrates a cross-sectional view of a first embodiment of the Lithium-Oxygen reserve battery.

As can be seen in FIG. 3, the reserve battery embodiment 10 comprises a metal anode, such as a Lithium metal electrode that is separated from the battery non-aqueous electrolyte by a Solid Electrolyte Interphase (SEI) layer. A porous cathode, such as a Carbon-based $O_2$ cathode is the next component of the battery core into which a gas such as Oxygen gas or a gas containing Oxygen can be allowed to enter to activate the reserve battery. The above components of the Li-Oxygen reserve battery are packaged inside a sealed housing 11. To achieve a hermetically sealed reserve battery with a shelf life of over 20 years, the battery terminals 12 can be provided with glass or other similar electrical insulation as they pass through the sealed housing 11.

In another sealed housing compartment 18, oxygen gas is provided under pressure as shown in FIG. 3. The sealed compartment 18 and the battery core housing 11 can share a common wall 19. The common wall 19 can be provided with a relatively small opening 14 into the battery core, which can be sealed by a metallic diaphragm 13. In general, the housings 11 and 18 can be formed from stainless steel and the diaphragm 13 can also be a thin stainless sheet that is welded to the wall 19.

Also provided inside the oxygen gas compartment 18 is a movable mass member 15, which can be biased firmly against surface 21 of the compartment 18, such as, by a preloaded compressive spring 16. The mass member 15 can be provided with a sharp cutting member 17, which is positioned above the hole 14.

The Li-Oxygen reserve battery embodiment 10 operates as follows. In normal conditions, the diaphragm 13 prevents oxygen gas from entering the porous carbon-based $O_2$ cathode of the battery core. If the device to which the reserve battery 10 is attached is accelerated in the direction of arrow 22, the acceleration would act on the mass member 15, generating a downward dynamic force. The compressive spring 16 is preloaded such that when the acceleration in the direction of the arrow 22 has reached a prescribed threshold, then the generated dynamic force would overcome the spring preload and the mass member 15 would begin to move downward towards the diaphragm 13. If the acceleration in the direction of the arrow 22 is long enough in duration, the mass member 15 would gain enough speed for the cutting member 17 to reach the diaphragm 13 and rupture it, thereby allowing the oxygen gas to begin to flow into the porous carbon-based $O_2$ cathode section of the battery core and activate the reserve battery. If the duration of the applied acceleration in the direction of the arrow 22 is very short, for example due to accidental drop of the object to which the reserve battery 10 is attached, the mass member 15 and spring 16 system is configured such that the cutting member 17 is not displaced down enough to rupture the diaphragm 13.

In the schematic of FIG. 3 only one inertia-based activation mechanism is shown to be provided. It is appreciated that when a larger amount of gas flow is desired, more than one activation mechanism of this type or another type and corresponding hole 14 and diaphragm 13 may also be provided.

It is appreciated by those skilled in the art that gases present in air, such as nitrogen, water vapor, and carbon dioxide can react with the metal anode, liquid electrolyte, and cathode electrode and negatively impact the discharge performance of currently available Lithium-Air batteries. In addition, it has been extensively reported (for example, J. Read, K. Mutolo, M. Ervin, W. Behl, J. Wolfenstine, A. Driedger and D. Foster, "Oxygen Transport Properties of Organic Electrolytes and Performance of Lithium/Oxygen Battery," *Journal of Electrochemical Society*, vol. 150, no. 10, pp. A1351-A1356, 2003) that a higher oxygen partial pressure improves battery capacity, especially at high discharge rates, by increasing the oxygen saturation concentration in the liquid electrolyte and by enhancing the oxygen diffusion rates in the porous cathode active sites. Therefore, pure oxygen can be used in the compartment 18 to activate and discharge the battery.

Figure 1:
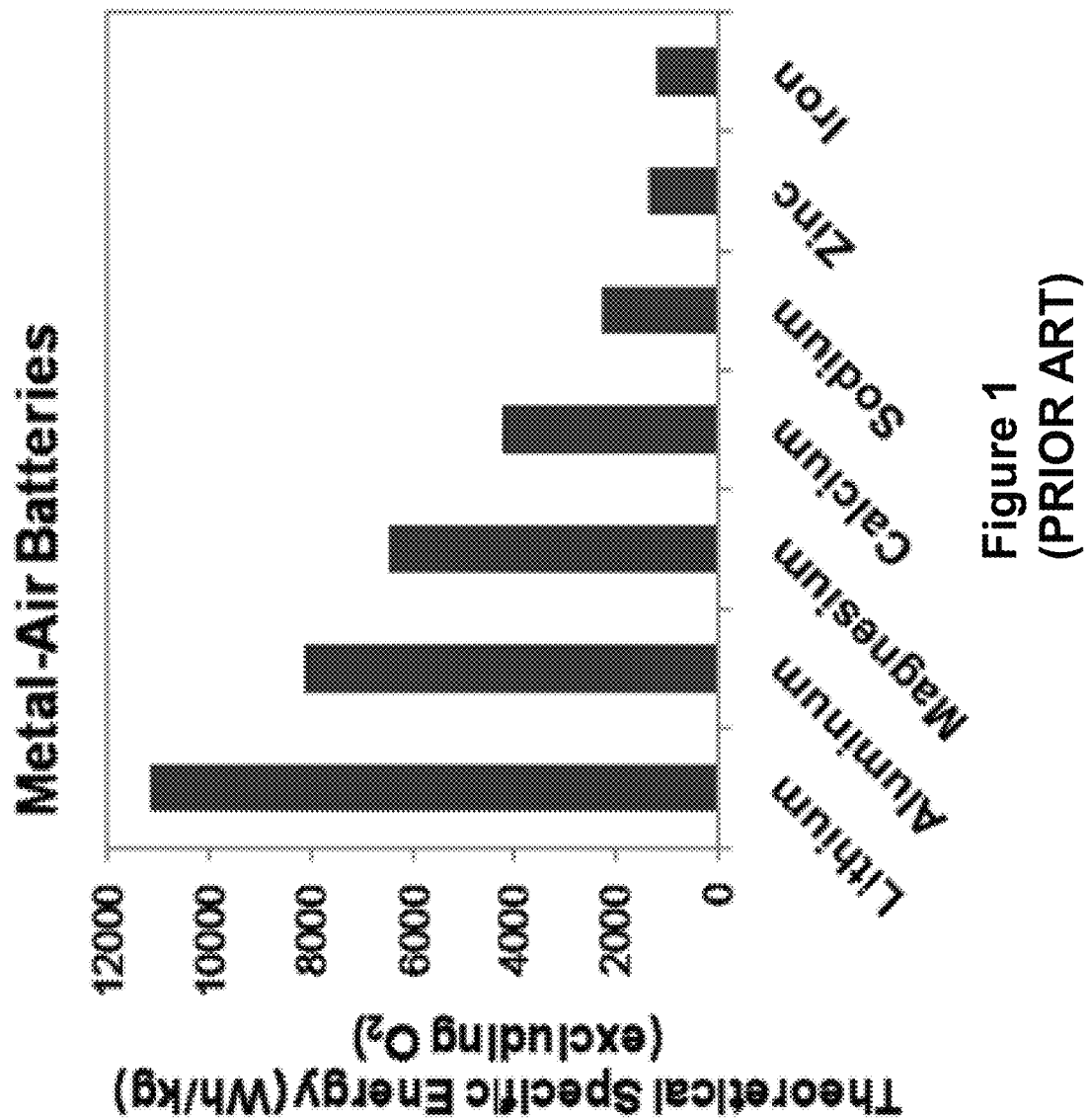
FIG. 1 illustrates theoretical specific energies of various metals known in the prior art which can be used in metal-air battery technology.

The reserve battery embodiment 10 of FIG. 1 is assembled in the inactive state with the pressurized oxygen in the adjacent compartment 18. As a result, as long as oxygen gas is not allowed to enter the battery core through the provided hole 14 by the diaphragm 13, the battery stays in its inactive state, thus serving as a reserve battery. Once the diaphragm 13 has been ruptured as was previously described, the presence of oxygen immediately starts the reduction/oxidation reactions inside the battery core and, as a result, a voltage differential is established across the anode and cathode sides of the cell. In the porous carbon cathode electrode, oxygen is reduced to lithium peroxide that accumulates in the pores of the electrode. At the same time, lithium metal from the anode electrode is oxidized to lithium ions, which transport to the cathode electrode through the liquid electrolyte and polymeric separator to the porous carbon cathode electrode. The battery discharge reactions will continue until all the stored oxygen or the available Li metal is consumed.

Figure 4:
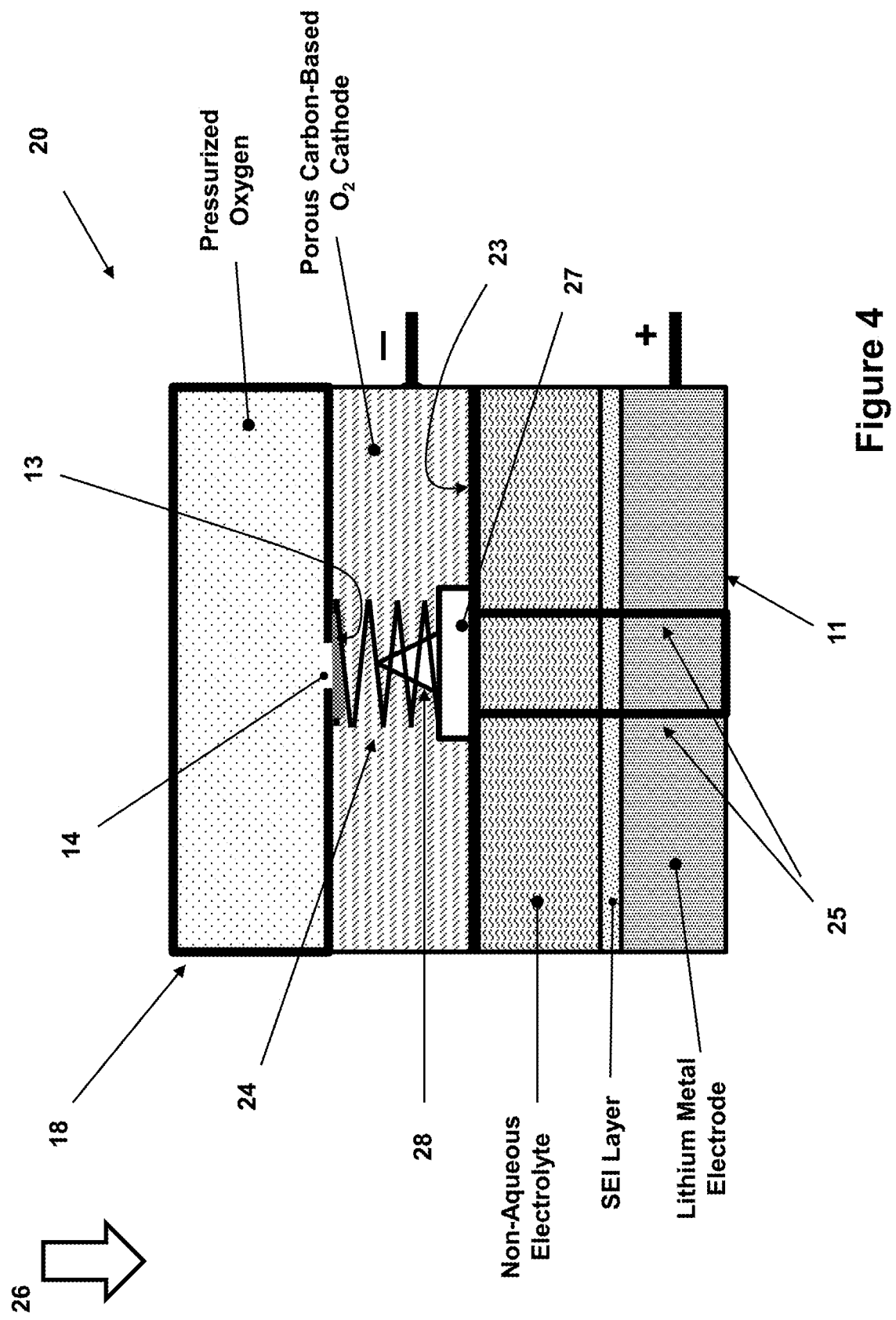
FIG. 4 illustrates a cross-sectional view of an alternative activation mechanism assembly in the Lithium-Oxygen reserve battery embodiment of FIG. 3.

In the Lithium-Oxygen embodiment 10 of FIG. 3, the mass-spring based inertial activation mechanism of the battery is positioned inside the pressurized oxygen comportment of the battery. An alternative positioning of the mass-spring inertial based activation mechanism inside the porous carbon-based $O_2$ cathode side of the reserve battery assembly is shown in the cross-sectional view of FIG. 4 and indicated as the reserve battery embodiment 20. In the schematic of FIG. 4, all other components of the reserve battery are similar to that of the embodiment 10 of FIG. 3. It is appreciated that to support the preloaded compressive spring 24 of the mass-spring based inertial activation mechanism, a support structure 23, for example a beam structure 23 or a base support structure 25 must be provided.

One advantage of locating the mass-spring based inertial activation mechanism inside the battery core may be that it makes the battery assembly easier and allows more space for the pressurized oxygen.

The Li-Oxygen reserve battery embodiment 20 of FIG. 4 operates as follows. In normal conditions, the diaphragm 13 prevents oxygen gas from entering the porous carbon-based $O_2$ cathode of the battery core. If the device to which the reserve battery 20 is attached is accelerated in the direction of the arrow 26, the acceleration would act on the mass member 27, which is movable within the housing 11, generating a downward dynamic force. The compressive spring 24 is preloaded such that when the acceleration in the direction of the arrow 26 has reached a prescribed threshold, then the generated dynamic force would overcome the spring preload and the mass member 27 would begin to move upward as viewed in FIG. 4 and towards the diaphragm 13. If the acceleration in the direction of the arrow 26 is long enough in duration, the mass member 27 would gain enough speed for the cutting member 28 to reach the diaphragm 13 and rupture it, thereby allowing the oxygen gas to begin to flow into the porous carbon-based $O_2$ cathode section of the battery core and activate the reserve battery. If the duration of the applied acceleration in the direction of the arrow 26 is very short, for example due to accidental drop of the object to which the reserve battery 20 is attached, the mass member 27 and spring 24 system is configured such that the cutting member 28 is not displaced up enough to rupture that diaphragm 13.

The Lithium-Oxygen reserve battery embodiments 10 and 20 of FIGS. 3 and 4, respectively, are configured to be activated when the device to which they are attached is subjected to a prescribed acceleration profile, such as firing of a gun. In certain applications, however, the reserve battery is required to be activated manually or via certain actuation device that is positioned external to the reserve battery. The reserve battery embodiment 30 of FIG. 5 is configured to allow for activation manually or using an external positioned actuation device.

Figure 5:
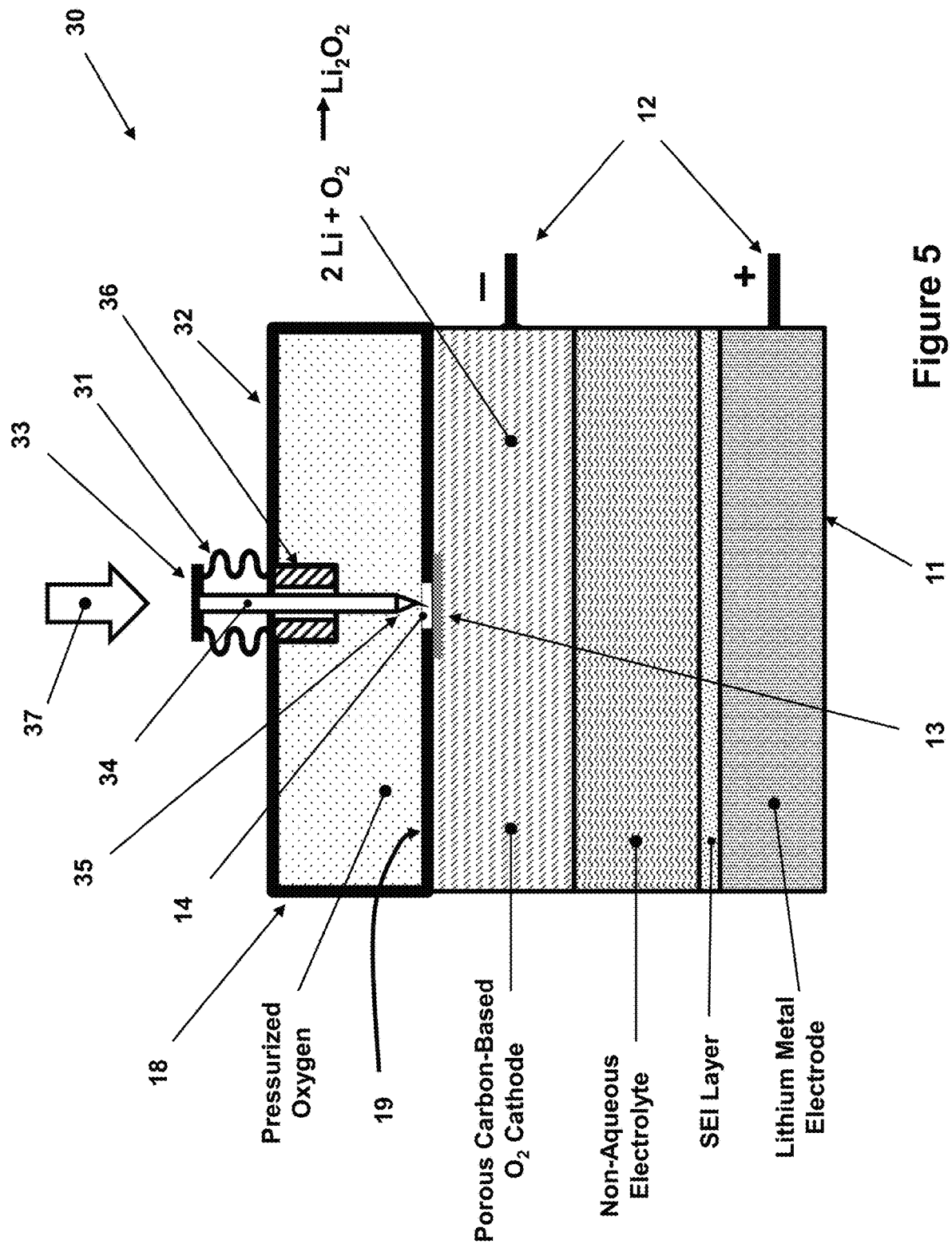
FIG. 5 illustrates a cross-sectional view of another embodiment of a Lithium-Oxygen reserve battery configured for activation manually or using an externally positioned actuation device.

In the schematic of FIG. 5, all other components of the reserve battery are similar to that of the embodiment 10 of FIG. 3, except that its mass-spring inertial activation mechanism is removed and is replaced by a mechanism that allows for manual activation or using an externally positioned actuation device as described below.

As can be seen in FIG. 5, the Lithium-Oxygen reserve battery embodiment 30 is provided with an activation mechanism comprising a metallic bellow 31, such as that formed with the same metal with which the container 18 is constructed, such as stainless steel. The bellow 31 is fixedly attached to the top surface of the oxygen gas container 18, such as by welding or brazing, and the attachment is tested to ensure that is fully sealed. The bellow is configured to have the required flexibility so that when pressed to activate the battery as described below, it would essentially act as a spring element and return to its normal state. The bellow is provided with a sealed cap 33, which may be integral to the bellow 31. A pin 34 is fixedly attached to the cap 33 of the bellow 31, which can be provided with a guide 36 inside the oxygen gas container 18 as can be seen in FIG. 5. The pin 34 is provided with a sharp tip 35, which is positioned over the hole 14 and proximate to the diaphragm 13.

The Li-Oxygen reserve battery embodiment 30 of FIG. 5 operates as follows. In normal conditions, the diaphragm 13 prevents oxygen gas from entering the porous carbon-based $O_2$ cathode of the battery core. The user then may manually press the cap 33 of the bellow 31 down in the direction of the arrow 37. As a result, the bellow 31 begins to deform, allowing the pin 34 to slide down the guide 36, causing the sharp tip 35 of the pin 34 to rupture the diaphragm 13, thereby allowing the oxygen gas to begin to flow into the porous carbon-based $O_2$ cathode section of the battery core and activate the reserve battery. It is appreciated by those skilled in the art that the cap 33 of the bellow 31 may also be displaced down by an externally positioned linear or rotary electrical, piezoelectric-based or pneumatic or the like actuation device on command, for example provided by a system control system, as is well known in the art.

Figure 6:
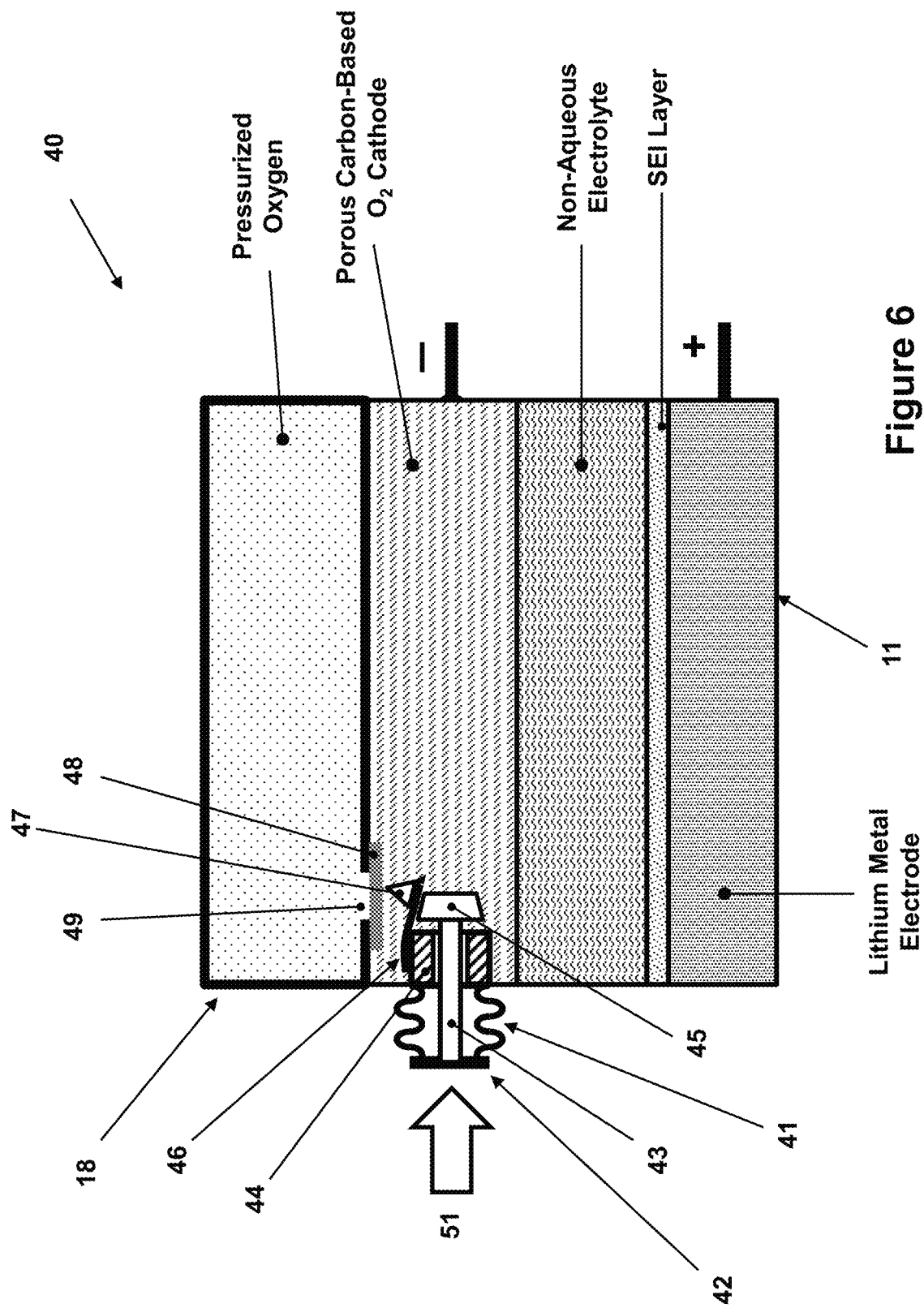
FIG. 6 illustrates a cross-sectional view of an alternative activation mechanism assembly of the embodiment of FIG. 5 in the Lithium-Oxygen reserve battery core.

In the Lithium-Oxygen embodiment 30 of FIG. 5, the manual or externally actuated activation mechanism of the battery is positioned at the pressurized oxygen comportment of the battery and must therefore be capable of withstanding the oxygen gas pressure while staying fully sealed. An alternative positioning of the activation mechanism is inside the porous carbon-based $O_2$ cathode side of the reserve battery assembly as shown in the cross-sectional view of FIG. 6. The resulting Lithium-Oxygen reserve battery is indicated as the embodiment 40. In the schematic of FIG. 6, all other components of the reserve battery are similar to that of the embodiment 10 of FIG. 3. Another advantage of locating the activation mechanism inside the battery core is that it makes the battery assembly easier and allows more space for the pressurized oxygen.

As can be seen in FIG. 6, the Lithium-Oxygen reserve battery embodiment 40 is provided with an activation mechanism that comprises a metallic bellow 41, such as being formed of the same metal with which the battery core housing 11 is constructed, such as stainless steel. The bellow 41 is fixedly attached to the side surface of the battery core housing 11, such as by welding or brazing, and the attachment is tested to ensure that is fully sealed. The bellow 41 is provided with a sealed cap 42, which may be integral to the bellow 41. A pin 43 is fixedly attached to the cap 42 of the bellow 41, which can be provided with a guide 44 inside the battery core housing 11 as can be seen in FIG. 6. The pin 43 is provided with an enlarged frontal section 45 that is movable within the housing 11 and that is close or in contact with the flexible member 46 that bends as a bending flexure or rotates about a joint and on which is provided a sharp tip member 47, which is positioned under the hole 49 and proximate to the diaphragm 48 as can be seen in FIG. 6.

The Li-Oxygen reserve battery embodiment 40 of FIG. 6 operates as follows. In normal conditions, the diaphragm 48 prevents oxygen gas from entering the porous carbon-based $O_2$ cathode of the battery core. The user then may manually press the cap 42 of the bellow 41 in the direction of the arrow 51. As a result, the bellow 41 begins to deform, allowing the pin 43 to slide in the guide 44, causing the sharp tip 45 of the pin 43 to bend/rotate the member 46 upward towards the diaphragm 48, thereby causing the sharp tip member 47 to rupture the diaphragm 48, thereby allowing the oxygen gas to begin to flow into the porous carbon-based $O_2$ cathode section of the battery core and activate the reserve battery. It is appreciated by those skilled in the art that the cap 42 of the bellow 41 may also be displaced down by an externally positioned linear or rotary electrical or piezoelectric-based or pneumatic or the like actuation device on command, for example provided by a system control system, as is well known in the art.

It is appreciated that once the novel Lithium-Oxygen reserve battery embodiments of FIGS. 3-6 are activated, they would generally stay activated until it runs out of either oxygen gas or Lithium metal. In many applications in which electrical energy may only be needed for relatively short periods of times and relatively long enough times in between, then it is highly desirable for a reserve battery to be capable of being activated only when needed and then be deactivated, i.e., reverted to its reserve battery state. The reserve batteries are herein described as if it is implemented in the Lithium-oxygen reserve battery embodiment 50 of FIG. 7.

Figure 7:
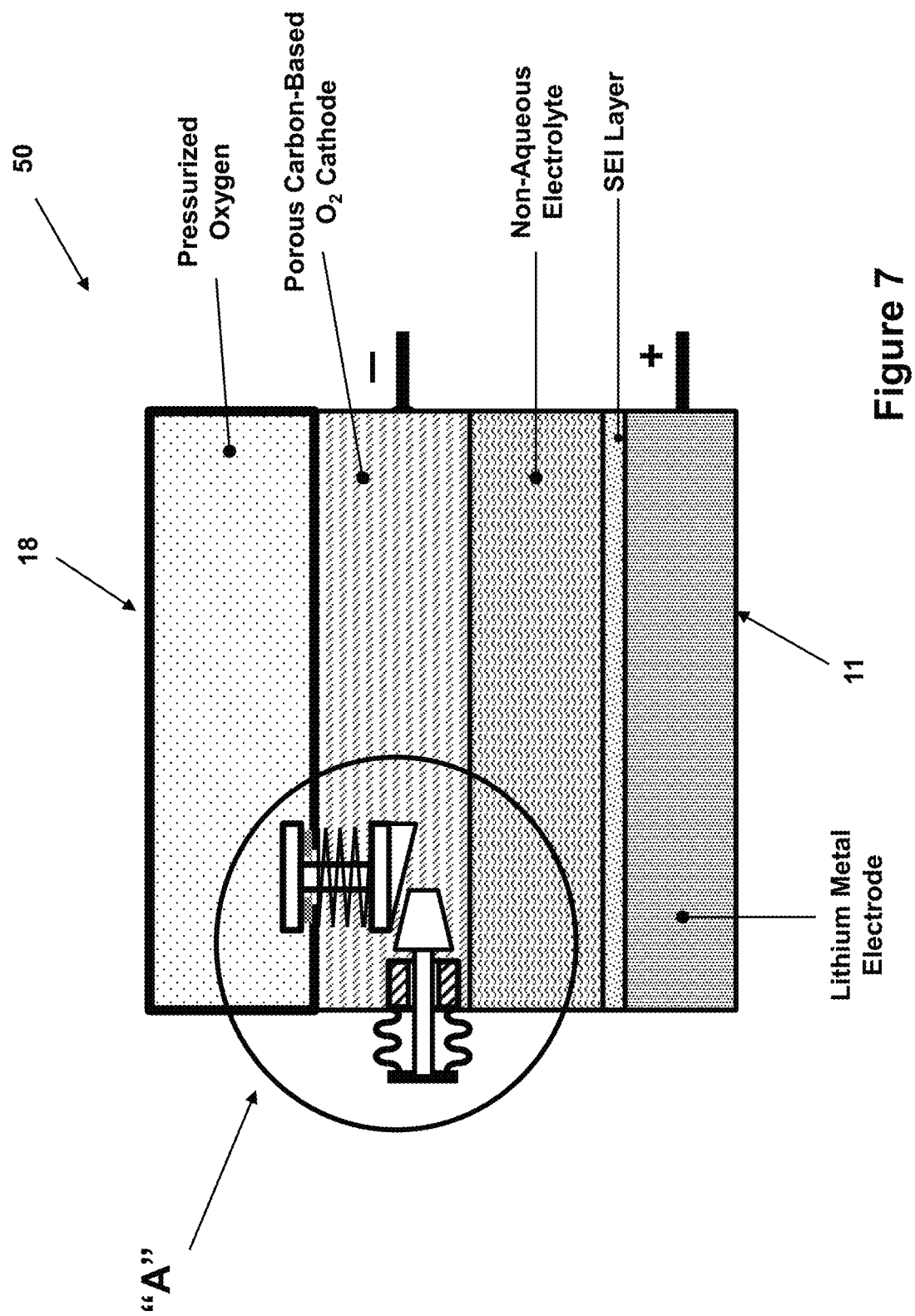
FIG. 7 illustrates a cross-sectional view of an embodiment of Lithium-Oxygen reserve battery configured to allow activation and deactivation of the reserve battery manually or via an externally positioned actuation device.
Figure 8:
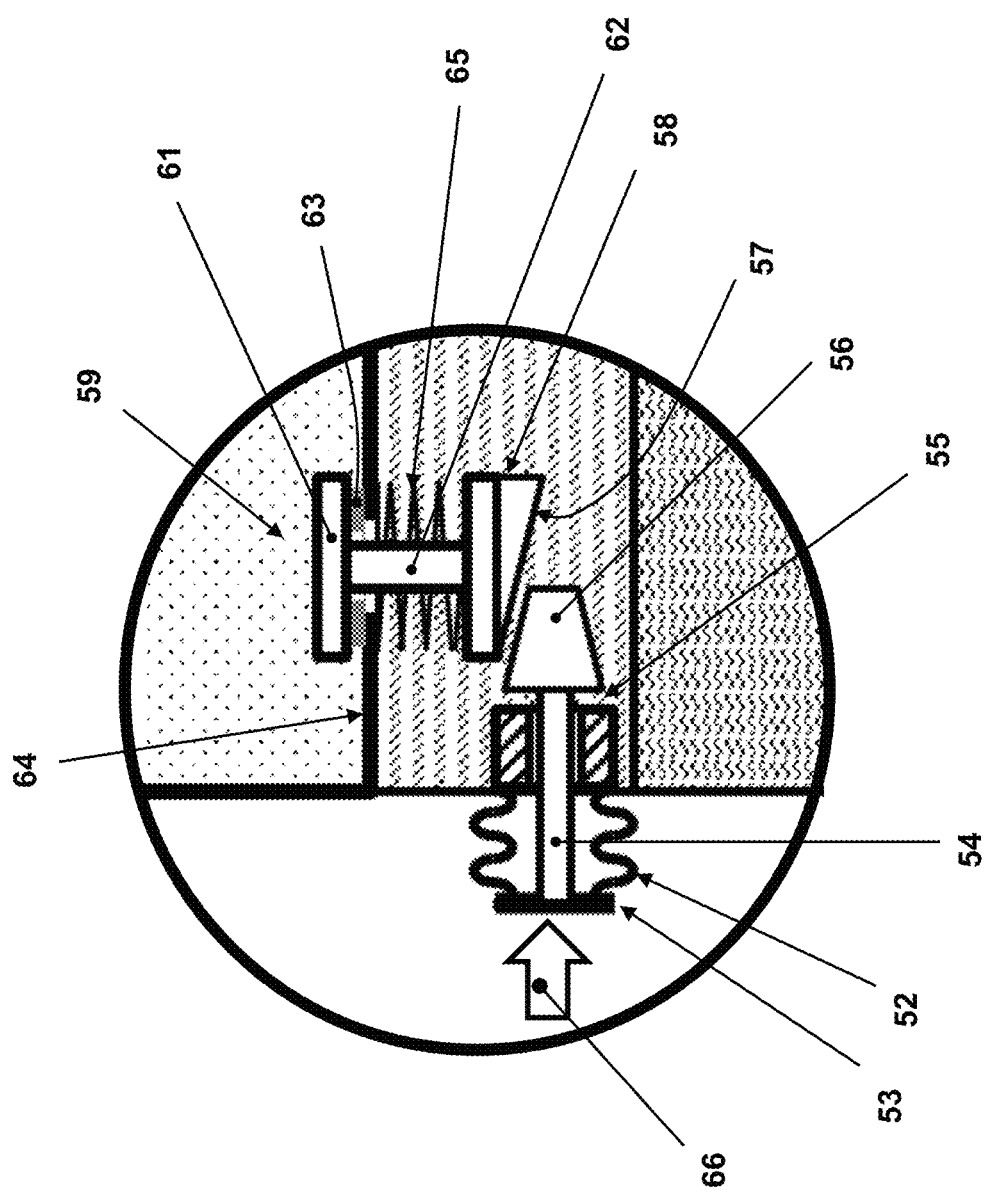
FIG. 8 illustrates a blow-up view "A" of FIG. 7 showing details of one mechanism for activating and deactivating the reserve battery.

In the schematic of FIG. 7, all components of the Lithium-oxygen reserve battery are similar to that of the embodiment 10 of FIG. 3, except that its mass-spring inertial activation mechanism is removed and is replaced by the activation/deactivation mechanism shown in the blow-up view "A", which is illustrated in detail in FIG. 8.

As can be seen in the blow-up view "A" of FIG. 8, the Lithium-Oxygen reserve battery embodiment 50 is provided with an activation mechanism comprising two components. The first component is the actuation mechanism that comprises a metallic bellow 52, that can be formed of the same metal with which the battery core housing 11 (FIG. 7) is constructed, such as stainless steel. The bellow 52 is fixedly attached to the side surface of the battery core housing 11, such as by welding or brazing, and the attachment is tested to ensure that is fully sealed. The bellow 52 is provided with a sealed cap 53, which may be integral to the bellow 52. A pin 54 is fixedly attached to the cap 53 of the bellow 52, which can be provided with a guide 55 inside the battery core housing 11 as can be seen in FIG. 8. The pin 54 is provided with an enlarged frontal conical section 56 that is close or in contact with a sloped surface 57 of the member 58 as shown in FIG. 8.

The second component of the actuation mechanism is a normally closed valve 59. The normally closed valve 59 comprises a valve cap 61, which is provided with a stem member 62 that passes through a hole that is provided in the base 64 of the oxygen gas container 18, FIG. 7. The opposite side of the stem member 62 is provided with the member 58, which is used to provide support for the preloaded compressive spring 65 and its bottom surface 57 is sloped as can be seen in FIG. 8 to engage the surface of the conical section 56 of the actuation mechanism. An elastomeric gasket 63 is also provided between the surface of the oxygen gas container surface 64 and a surface of the valve cap 61. The compressive spring 65 is preloaded enough to ensure that in its normally closed state, no oxygen gas can escape into the battery core from the pressurized oxygen container 18. The pressurized oxygen gas itself also assists in sealing of the valve in its normally closed state.

The Li-Oxygen reserve battery embodiment 50 of FIG. 7 operates as follows. In normal conditions, the valve 59 is closed and prevents oxygen gas from entering the porous carbon-based $O_2$ cathode of the battery core. The reserve battery 50 is therefore in its inactive state and provides a long shelf life that can significantly exceed the military required 20 years. The user may then manually press the cap 53 of the bellow 52 in the direction of the arrow 66, FIG. 8. As a result, the bellow 52 begins to deform, allowing the pin 54 to slide forward in the guide 55, causing the conical section 56 to move forward, thereby engaging the sloped surface 57 of the member 58 and forcing it to begin to move upward as seen in the view of FIG. 8. As a result, the cap 61 is lifted from over the elastomeric gasket 63, thereby allowing the oxygen gas to begin to flow into the porous carbon-based $O_2$ cathode section of the battery core and activate the reserve battery. When the applied force to the cap 53 of the bellow 52 in the direction of the arrow is removed, the compressed bellow 52 would spring back (which might be assisted by an internal compressive spring that is provided around the pin 54 inside the bellow—not shown), thereby allowing the preloaded compressive spring 65 and the pressurized oxygen gas to close the valve 59 and stop transfer of pressurized gas into porous carbon-based $O_2$ cathode section of the battery core. The battery is thereby reverted to its reserve state and the battery core would stop generating electrical energy once its present oxygen gas has been consumed.

It is appreciated by those skilled in the art that the cap 53 of the bellow 52, FIG. 8, may also be displaced forward in the direction of the arrow 66 by an externally positioned linear or rotary electrical or piezoelectric-based or pneumatic or the like actuation device on command, for example provided by a system control system, as is well known in the art.

It is noted that in the embodiments 30, 40 and 50 of FIGS. 5, 6 and 7, respectively, the activation mechanism bellow is positioned outside of the reserve battery housing. Such positioning of the activation device bellow may then be used to provide a "safety pin" for the reserve battery to protect it against accidental activation, such as during the battery fabrication and packaging and during the process of installing in the final product. The "safety pin" may in general be positioned between the bellow cap (33, 42 and 53 in FIGS. 5, 6 and 8, respectively) and the outer surface of the reserve battery. An example of such a bellow actuation preventing "safety pin" as applied to the activation mechanism of the reserve battery embodiment 30 of FIG. 5 is shown in the schematics of FIG. 8A and the top view of FIG. 8B.

In the schematic of FIG. 8A the reserve battery activation mechanism of the Lithium-Oxygen reserve battery embodiment 30 of FIG. 5 as mounted on the top surface 145 (32 in FIG. 5) of the oxygen gas container 146 is shown. As was described for the embodiment of FIG. 5, the bellow 140 (31 in FIG. 5) is fixedly attached to the surface 145. The bellow 140 is provided with a sealing cap 143, which is larger than the cap 33 of the embodiment of FIG. 5. The sliding pin 144 (34 in FIG. 5) with the sharp tip is also shown in FIG. 8A. The "safety pin" of the activation mechanism comprises a "U" shaped member 147, which is positioned around the bellow 140 and under the edges 148 of the cap 143 as can be seen in FIG. 8A and the top view of FIG. 8B. It is noted that FIG. 8A is the cross-sectional view C-C of FIG. 8B. The "U" shaped member 147 would then prevent accidental depression of the cap 143 and thereby accidental activation of the reserve battery. A pin 149 can also be provided that passes through matching holes (not seen in FIG. 8A) through the ends of the "U" shaped member 147 as shown in FIG. 8B to prevent the "U" shaped member 147 from falling off as the reserve battery is handled. With the described "safety pin" assembly, the reserve battery is rendered non-operational. To make the reserve battery operational, the user would pull the pin 149 out to allow the "U" shaped member 147 to be pulled out from under the cap 143, thereby freeing the bellow 140 to be depressed to rupture the membrane 13 (FIG. 5), thereby activating the reserve battery as was previously described.

The valve 59 configuration may be readily adapted to provide an inertial activation mechanism that does not rely on rupturing a diaphragm, such as was described for the Lithium-oxygen reserve battery embodiment 20 of FIG. 4. Such a Lithium-oxygen reserve battery embodiment 60 is shown in the cross-sectional schematic of FIG. 9. Such a Lithium-oxygen reserve battery embodiment 60 has two basic advantages over the embodiment 20 of FIG. 4. The first advantage is that it does not require the support structure (23 or 25 in FIG. 4). As a result, it makes the reserve battery fabrication and assembly simpler. Secondly, since the pressurized oxygen gas assists in keeping the valve closed and sealed, the preloaded compressive spring is only required to provide a relatively small force to keep the valve components together before and after activation.

Figure 9:
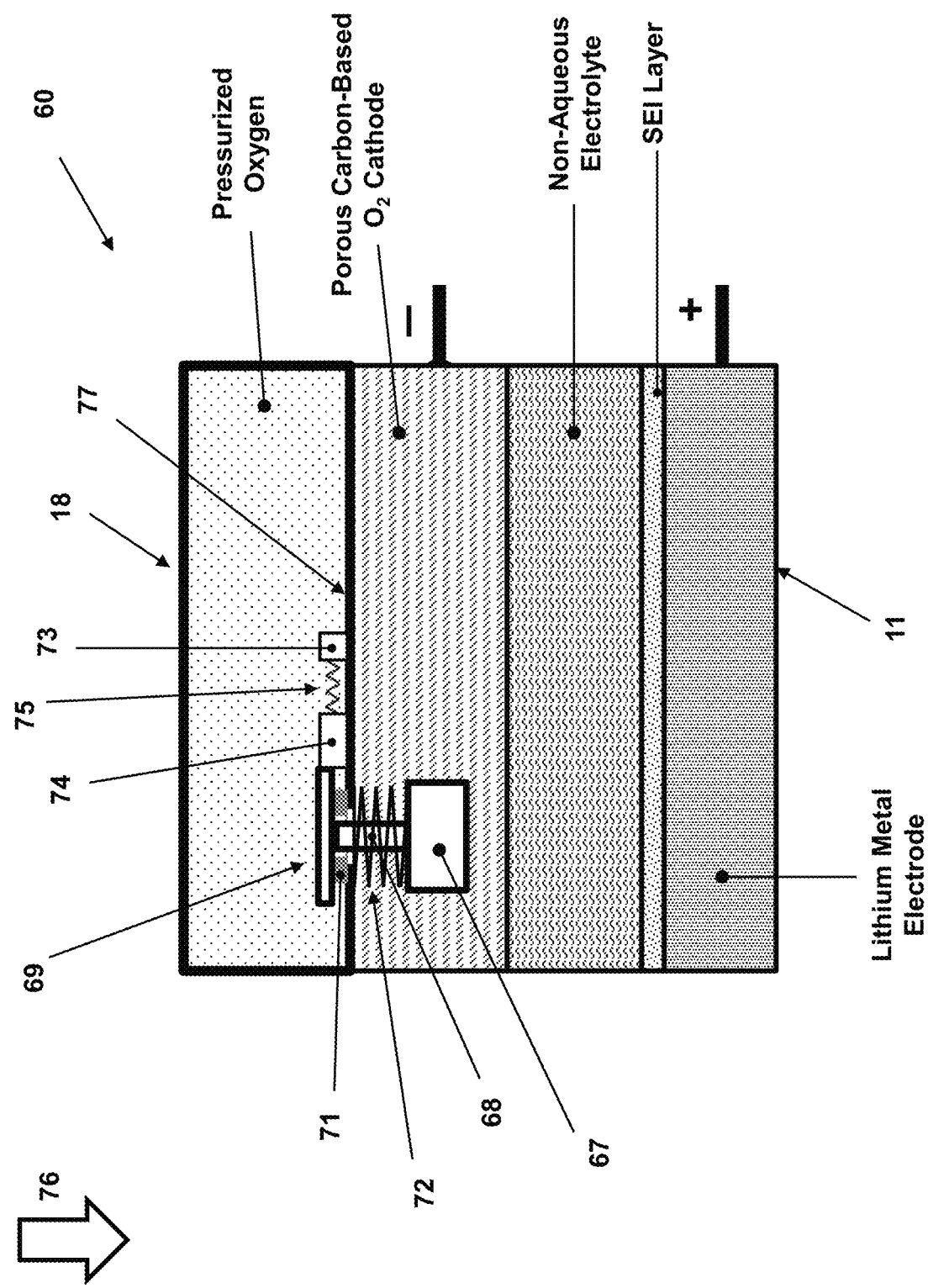
FIG. 9 illustrates a cross-sectional view of another embodiment of Lithium-Oxygen reserve battery configured to be activated when subjected to a prescribed acceleration profile.

In the Lithium-Oxygen embodiment 60 of FIG. 9, the inertial activation mechanism comprises a mass member 67, which is movable in the housing 11 and which is connected to the valve cap 69 by a connecting member 68 that passes through a hole provided in the base of the pressurized oxygen gas container 18. An elastomeric gasket 71 is provided under the valve cap 69 and is pressed down by the preloaded compressive spring 72 and the pressure of the oxygen gas to ensure that there is no leakage of the oxygen gas into the battery core through the provided hole in the oxygen gas container. A support member 73 is fixedly attached to the bottom surface 77 of the pressurized oxygen gas container 18. A sliding member 74 is then provided that is normally pressed slightly against the side of the valve cap 74 by the preloaded compressive spring 75. All other components of the Lithium-oxygen reserve battery embodiment 60 are similar to that of the embodiment 10 of FIG. 3.

The Li-Oxygen reserve battery embodiment 60 of FIG. 9 operates as follows. In normal conditions, the preloaded compressive spring 72 and the pressurized oxygen gas in the container 18 keep the valve closed and prevent oxygen gas from entering the porous carbon-based $O_2$ cathode of the battery core. If the device to which the reserve battery 60 is attached is accelerated in the direction of the arrow 76, the acceleration would act on the inertia of the mass member 67 and the connecting member 68 and the cap 69, generating an upward dynamic force. The compressive spring 72 is preloaded such that when the acceleration in the direction of the arrow 76 has reached a prescribed threshold, then the generated dynamic force would overcome the spring preload and the assembly of the mass member 67, connecting member 68 and the cap 69 would begin to move upward as viewed in FIG. 9. If the acceleration in the direction of the arrow 76 is long enough in duration, the cap 69 is moved up enough to allow the pressurized oxygen gas to begin to flow into the porous carbon-based $O_2$ cathode section of the battery core and activate the reserve battery. Once the cap 69 has moved up, the gap between the bottom surface of the cap 69 and the surface 77 of the container 18 is configured to be enough to allow the "locking" member 74 to be pushed under the cap 69 and prevent the cap to close the flow of the oxygen gas into the battery core once the acceleration in the direction of the arrow 76 has ceased. Thereby, the reserve battery is activated and stays activated after the acceleration event, for example due to the firing of a munition in which the reserve battery is mounted. If the applied acceleration in the direction of the arrow 76 is below the prescribed threshold, for example due to accidental drop of the object to which the reserve battery 60 is attached, the valve stays closed and the reserve battery is not activated.

It is appreciated that the Lithium-oxygen reserve battery embodiment 50 of FIG. 7 can be activated using a linear or rotary electrical or piezoelectric-based actuation device such as a solenoid as was previously described. However, an external power source is needed at the time of initial reserve battery activation. This requirement may not be desirable in some munition applications.

Figure 10:
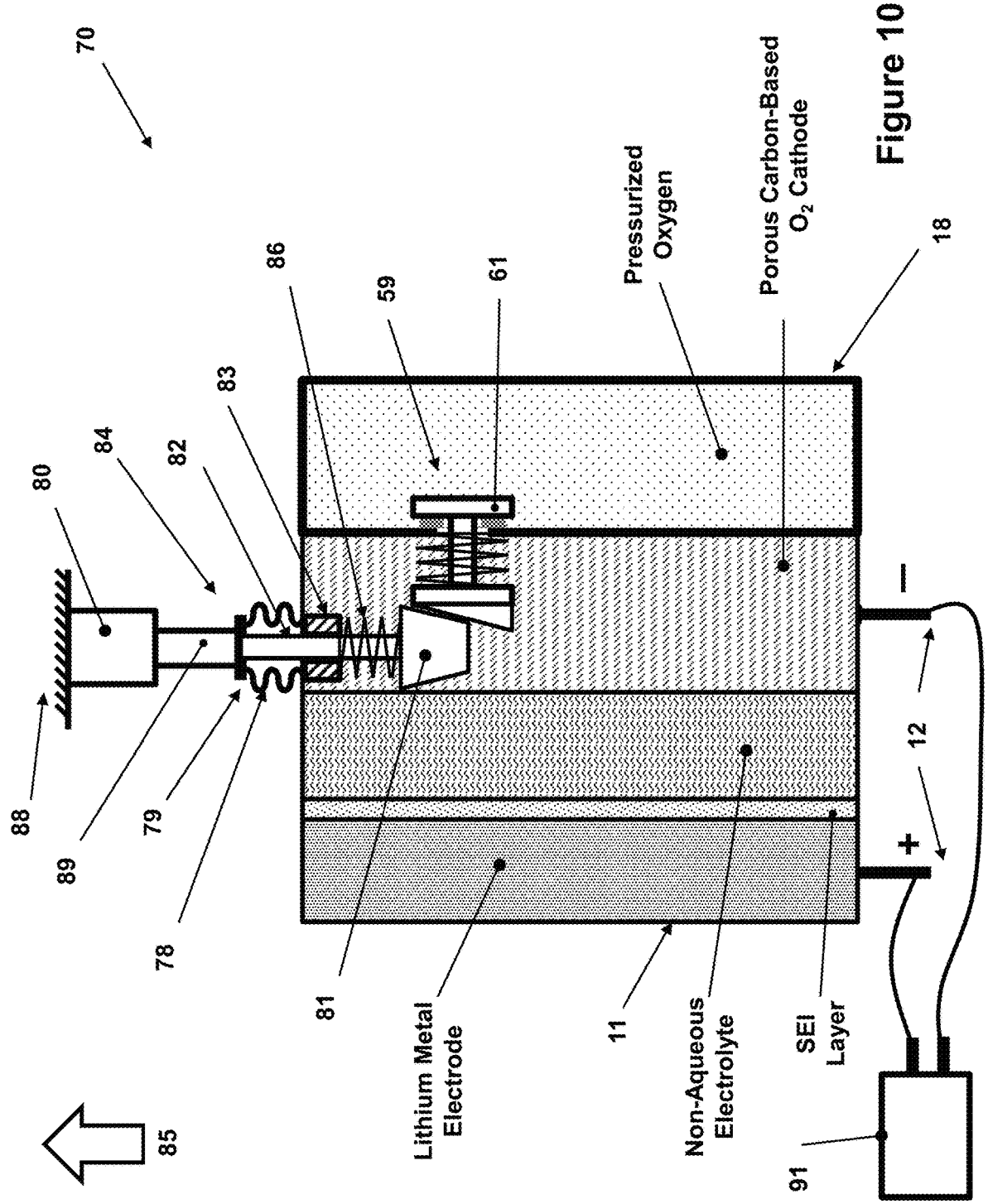
FIG. 10 illustrates a cross-sectional view of another embodiment of Lithium-oxygen reserve battery configured for an initial activation when subjected to a prescribed acceleration profile and for consequent activation/deactivation on command.

The Lithium-oxygen reserve battery embodiment 70 of FIG. 10 is configured to be activated during the munitions firing for a short period of time to activate the reserve battery long enough to generate the electrical energy needed to operate the electrically actuated activation mechanism of the reserve battery as required by the system being powered by the reserve battery.

In the Lithium-Oxygen reserve battery embodiment 70 of FIG. 10, the battery activation mechanism comprises the normally closed valve 59, FIG. 8, and the actuation mechanism 84. The components of the normally closed valve 59 are similar to that used in the embodiment of FIG. 8. All other components of the Lithium-oxygen reserve battery embodiment 70 are similar to that of the embodiment 10 of FIG. 3.

The actuation mechanism 84 of the Lithium-Oxygen reserve battery embodiment 70 of FIG. 10 is similar to the one used in the embodiment 50 of FIG. 7 (also shown in the blow up view of FIG. 8), and similarly comprises a metallic bellow 78, such as being formed of the same metal with which the battery core housing 11 (FIG. 10) is constructed, such as stainless steel. The bellow 78 is fixedly attached to the side surface of the battery core housing 11, such as by welding or brazing, and the attachment is tested to ensure that is fully sealed. The bellow 78 is provided with a sealed cap 79, which may be integral to the bellow 78. A connecting member 82 is fixedly attached to the cap 79 of the bellow 78, which is provided with a guide 83 inside the battery core housing 11 as can be seen in FIG. 10. The connecting member 82 is provided with an enlarged frontal conical section mass member 81 (56 in FIG. 8) that is close or in contact with the sloped surface 57 of the member 58 of the normally closed valve 59 as can also be seen in FIG. 8. A preloaded tensile spring 86 may also be provided to ensure that in normal conditions, the mass member does not force the valve 59 to open. It is appreciated by those skilled in the art that instead of the preloaded tensile spring 86, a preloaded compressive spring (not shown) may be placed inside the bellow 78 to serve the same function.

The Li-Oxygen reserve battery embodiment 70 of FIG. 10 operates as follows. In normal conditions, as can be seen in the blow-up view of FIG. 8, the valve 59 is in its closed state and prevents oxygen gas from entering the porous carbon-based $O_2$ cathode of the battery core. In this state, the biasing forces of the compressively preloaded spring 65 (FIG. 8) and the pressure of the oxygen gas ensures that the valve 59 stays closed. The reserve battery 70 is therefore in its inactive state and provides a long shelf life that can significantly exceed the military required 20 years. If the device to which the reserve battery 70 is attached is accelerated in the direction of the arrow 85, the acceleration would act on the inertia of the mass member 81 and the connecting member 82 and the cap 79, generating a downward dynamic force as seen in the view of FIG. 10. The tensile spring 86 is preloaded such that when the acceleration in the direction of the arrow 85 has reached a prescribed threshold, then the generated dynamic force would overcome the spring preload and the assembly of the mass member 81 and the connecting member 82 and the cap 79 would begin to move down as viewed in FIG. 10. If the acceleration in the direction of the arrow 85 is long enough in duration, the bellow 78 begins to deform, allowing the conical mass member 81 to move down, thereby engaging the sloped surface 57 of the member 58 (FIG. 8) and forcing it to begin to move to the right as seen in the view of FIG. 10. As a result, the cap 61 is lifted from over the elastomeric gasket 63 (FIG. 8), thereby allowing the oxygen gas to begin to flow into the porous carbon-based $O_2$ cathode section of the battery core and activate the reserve battery. Then once the acceleration in the direction of the arrow 85 has ceased, the mass member 81 is forced to return to its pre-acceleration position shown in FIG. 10 by the preloaded tensile spring 83 and the valve 59 is closed and the flow of oxygen gas into the battery core is stopped.

If the applied acceleration in the direction of the arrow 85 is below the prescribed threshold, for example due to accidental drop of the object to which the reserve battery 70 is attached, the preloading level of the tensile spring 86 is not overcome, and the mass member 81 dose not engage the sloped surface 57 of the member 58 and the valve 59 stays closed.

The Lithium-Oxygen reserve battery embodiment 70 of FIG. 10 is also provided with a linear or rotary electrical or piezoelectric-based or the like actuation device, such as a solenoid 80, which can be used to similarly apply an actuating force to the cap 79 by its linearly displacing core 89 to open the valve 59 as was described above to let an inflow of oxygen gas into the battery core on demand. In the present embodiment 70, the inertial activation in response to a prescribed acceleration profile as was previously described is configured to allow enough oxygen gas into the battery core to power the device electronics and power control system and to operate the on/off activation actuation device, in this case the solenoid 80.

In the Lithium-Oxygen reserve battery embodiment 70 of FIG. 10, the inertial activation in response to a prescribed acceleration profile is configured to allow enough oxygen gas into the battery core to power the device electronics and power control system and to operate the on/off activation actuation device, in this case the solenoid 80. Alternatively, the Lithium-Oxygen reserve battery embodiment 70 may be paired with a capacitor (or supercapacitor) 91, which is charged by the electrical energy generated by the initial activation of the reserve battery. The electrical energy stored in the capacitor 91 can then be used by the object to which the reserve battery is attached (e.g., a gun fired munition), and to re-activate the reserve battery as needed by the actuator 80. Such a combined Lithium-Oxygen reserve battery and capacitor (super-capacitor) reserve power sources are hereinafter referred to as the "Lithium-Oxygen hybrid reserve batteries."

It is appreciated that the Lithium-oxygen reserve battery embodiment 70 of FIG. 10 is configured to be activated during the munitions firing for a short period of time to activate the reserve battery long enough to generate the electrical energy needed to operate the electrically actuated activation mechanism of the reserve battery as required by the system being powered by the reserve battery. The actuation mechanism shown is the schematic of FIG. 10 is a linear solenoid. However, other linear or rotary electrical or piezoelectric-based or the like actuators may also be used for this purpose. In the embodiment 70 of FIG. 10, the linear solenoid actuation device is shown to be positioned external to the reserve battery housing. In many munition applications, it is highly desirable that all components of the reserve battery be inside a hermetically sealed housing. To this end, the reserve battery embodiment 70 is modified as described below to house all externally positioned components of the reserve battery inside the hermetically sealed battery housing as shown in the embodiment 90 of FIG. 11.

Figure 11:
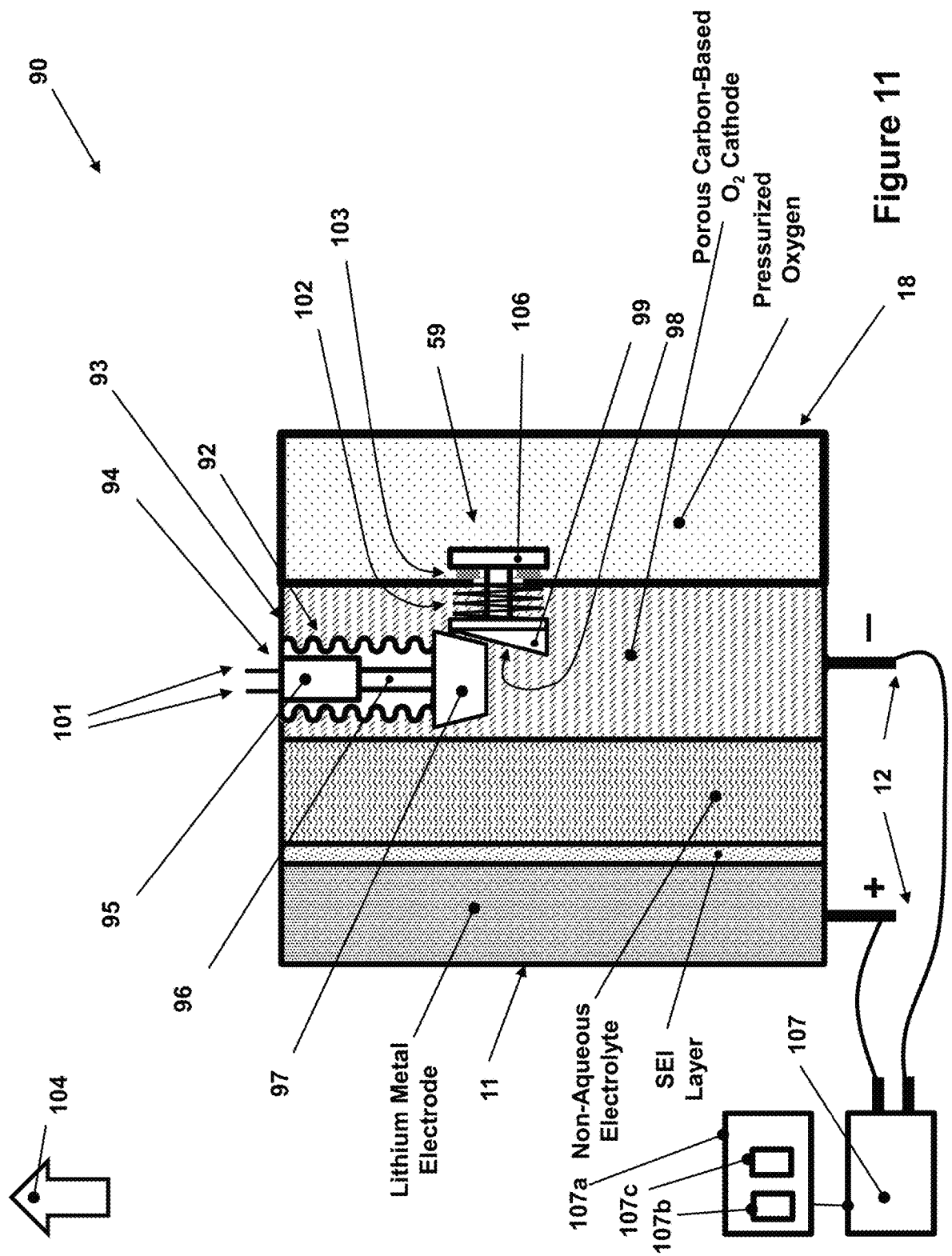
FIG. 11 illustrates a cross-sectional view of another embodiment of Lithium-oxygen reserve battery that can be initially activated inertially when subjected to a prescribed acceleration profile or from external power and for consequent activation/deactivation on command.

In the Lithium-Oxygen reserve battery embodiment 90 of FIG. 11, the battery activation mechanism comprises the normally closed valve 59, FIG. 8, and the linear solenoid (or piezoelectric-based actuation) mechanism. The configuration and all the components of the normally closed valve 59 are similar to those used in the embodiment of FIG. 8. All other components of the Lithium-oxygen reserve battery embodiment 70 are similar to that of the embodiment 10 of FIG. 3.

The actuation mechanism of the Lithium-Oxygen reserve battery embodiment 90 of FIG. 11 comprises a metallic bellow 92, which can be formed of the same metal with which the battery core housing 11 is constructed, such as stainless steel. The bellow 92 is fixedly attached to the side surface 93 of the battery core housing 11, such as by welding or brazing, and the attachment is tested to ensure that is fully sealed. The bellow 92 is provided with a sealed cap 94, which may be integral to the bellow 92. A linear solenoid actuator 95 (or a piezoelectric or the like electrically actuated device) is positioned inside the bellow and fixed to the cap 94 as can be seen in FIG. 11. In FIG. 11, the terminals 101 indicate the powering terminals of the solenoid 95, which are passed through the electrical insulations (not shown) provided in the cap 94. The actuating core 96 of the solenoid 95 is then attached to a conical section shaped mass member 97. The mass member 97 is fixedly attached and sealed to the bellow 92. The conical section mass member 97 (56 in FIG. 8) is positioned close or in contact with the sloped surface 98 (57 in FIG. 8) of the member 99 (58 in FIG. 8) of the normally closed valve 59 as can also be seen in FIG. 11. The solenoid 95 is provided with a proper return spring so that while it is not energized, the mass member 97 is at the position shown in FIG. 11 and does not force the valve 59 to open. The cap 94 may be provided with a small hole to prevent the air (gas) trapped inside the bellow 92 from resisting its extension.

The Li-Oxygen reserve battery embodiment 90 of FIG. 11 operates as follows. In normal conditions, the valve 59 is in its closed state and prevents oxygen gas from entering the porous carbon-based $O_2$ cathode of the battery core. In this state, the biasing forces of the compressively preloaded spring 102 (65 in FIG. 8) and the pressure of the oxygen gas ensures that the valve 59 stays closed. The Li-Oxygen reserve battery 90 is therefore in its inactive state and provides a long shelf life that can significantly exceed the military required 20 years. If the device to which the reserve battery 90 is attached is accelerated in the direction of the arrow 104, the acceleration would act on the inertia of the mass member 97 and the solenoid core 96, generating a downward dynamic force as seen in the view of FIG. 11. The biasing spring in the solenoid 96 (not shown) is preloaded such that when the acceleration in the direction of the arrow 104 has reached a prescribed threshold, then the generated dynamic force would overcome the spring preload and the assembly of the mass member 97 and the solenoid core 96 would begin to move down as viewed in FIG. 11. It is appreciated that a preloaded tensile spring (not shown) may instead be provided around the solenoid core 96 (similar to preloaded tensile spring 86 in FIG. 10) to perform the same function. If the acceleration in the direction of the arrow 104 is long enough in duration, the bellow 92 begins to deform, allowing the conical mass member 97 to move down, thereby engaging the sloped surface 98 of the member 99 (58 in FIG. 8) and forcing it to begin to move to the right as seen in the view of FIG. 11. As a result, the cap 106 (61 in FIG. 8) is lifted from over the elastomeric gasket 103 (63 in FIG. 8), thereby allowing the oxygen gas to begin to flow into the porous carbon-based $O_2$ cathode section of the battery core and activate the reserve battery. Then once the acceleration in the direction of the arrow 104 has ceased, the mass member 97 is forced to return to its pre-acceleration position shown in FIG. 11 by the preloaded biasing spring of the solenoid 95, the extended bellow 92, preloaded compressive spring 102 and the oxygen gas pressure, thereby closing the valve 59 and stopping the flow of oxygen gas into the battery core.

If the applied acceleration in the direction of the arrow 104 is below the prescribed threshold, for example due to accidental drop of the object to which the reserve battery 90 is attached, the preloading level of the aforementioned biasing tensile springs are not overcome, and the mass member 97 assembly dose not engage the sloped surface 98 of the member 99 and the valve 59 stays closed.

It is appreciated by those skilled in the art that the linear solenoid actuator 95 (or other similar linear or rotary actuators) may be of a latching type. In such a case, at any point in time following initial inertial activation, the battery may be activated and made to remain activated without requiring power to be continuously be applied to the actuator 95. The solenoid may also be actuated less than the distance that activates the latching mechanism, thereby providing the capability to reactivate the reserve battery several times until it is desired to stay permanently activated, at which time the solenoid is actuated to the point of activating its latching mechanism.

It is also appreciated by those skilled in the art that all electronic and drive components and the capacitor 107 that are used to sense the reserve battery embodiment 90 power level and activate the battery as needed may also be integrated inside the reserve battery housing 11. Such self-contained Li-Oxygen reserve batteries would greatly simplify their integration into various devices such as gun-fired munitions.

In the Li-Oxygen reserve battery embodiment 90, the inertial activation in response to the prescribed acceleration profile is configured to allow enough oxygen gas into the battery core to power the device electronics and power control system and to operate the solenoid 95 to open and close the valve 59 when needed to supply the required electrical energy. The reserve battery embodiment 90 may also be provided with a capacitor or super-capacitor 107 as was shown in FIG. 10 to form a "Lithium-Oxygen hybrid reserve battery".

In the Lithium-Oxygen reserve battery embodiment 90 of FIG. 11, similar to the embodiment 70 of FIG. 10, the inertial activation in response to a prescribed acceleration profile is configured to allow enough oxygen gas into the battery core to power the device electronics and power control system and to operate the on/off activation actuation device, in this case the solenoid 95. Alternatively, the Lithium-Oxygen reserve battery embodiment 90 may be paired with a capacitor (or supercapacitor) 107, which is charged by the electrical energy generated by the initial activation of the reserve battery. The electrical energy stored in the capacitor 107 can then be used by the object to which the reserve battery is attached (e.g., a gun fired munition), and to re-activate the reserve battery as needed by the actuator 95. Such a combined Lithium-Oxygen reserve battery and capacitor (super-capacitor) reserve power source forms a previously described "Lithium-Oxygen hybrid reserve battery".

It is appreciated by those skilled in the art that such "Lithium-Oxygen hybrid reserve batteries" are particularly advantageous for use in applications in which they are required to provide low power for long periods of times and only occasionally have to provide high power, usually for relatively short periods of time. In such applications, the reserve battery only needs to be activated for very short periods of times to charge the capacitor and have the capacitor supply the low power to usually low power electronics for hours and sometimes for days until either high power is required to be provided or when the capacitor power is low and it needs to be recharged, at which time the capacitor supplies power to the activation actuator, FIGS. 10 and 11.

In one embodiment of the present "Lithium-Oxygen hybrid reserve batteries", a controller/processor, such as an electronic control circuit 107a can be provided to detect the voltage level of the hybrid reserve battery electrical energy storage capacitor (e.g., 91 in FIG. 10) and energize the battery activation actuator (80 in FIG. 10) for a prescribed amount of time to allow a prescribed amount of oxygen gas to flow into the battery core for its activation. In addition, the electronic control circuit may be provided with a microprocessor 107b and memory 107c so that it could be programmed to provide a prescribed power level based on a received sensory input and/or planned profile. The control circuit electrically connecting the capacitor (energy storage device) to the terminals 101 of the solenoid 95 (actuation device).

It is also appreciated by those skilled in the art that the Lithium-Oxygen reserve battery embodiment 90 may also be activated directly by energizing the solenoid 95 in non-shock loading activation applications.

Figure 12:
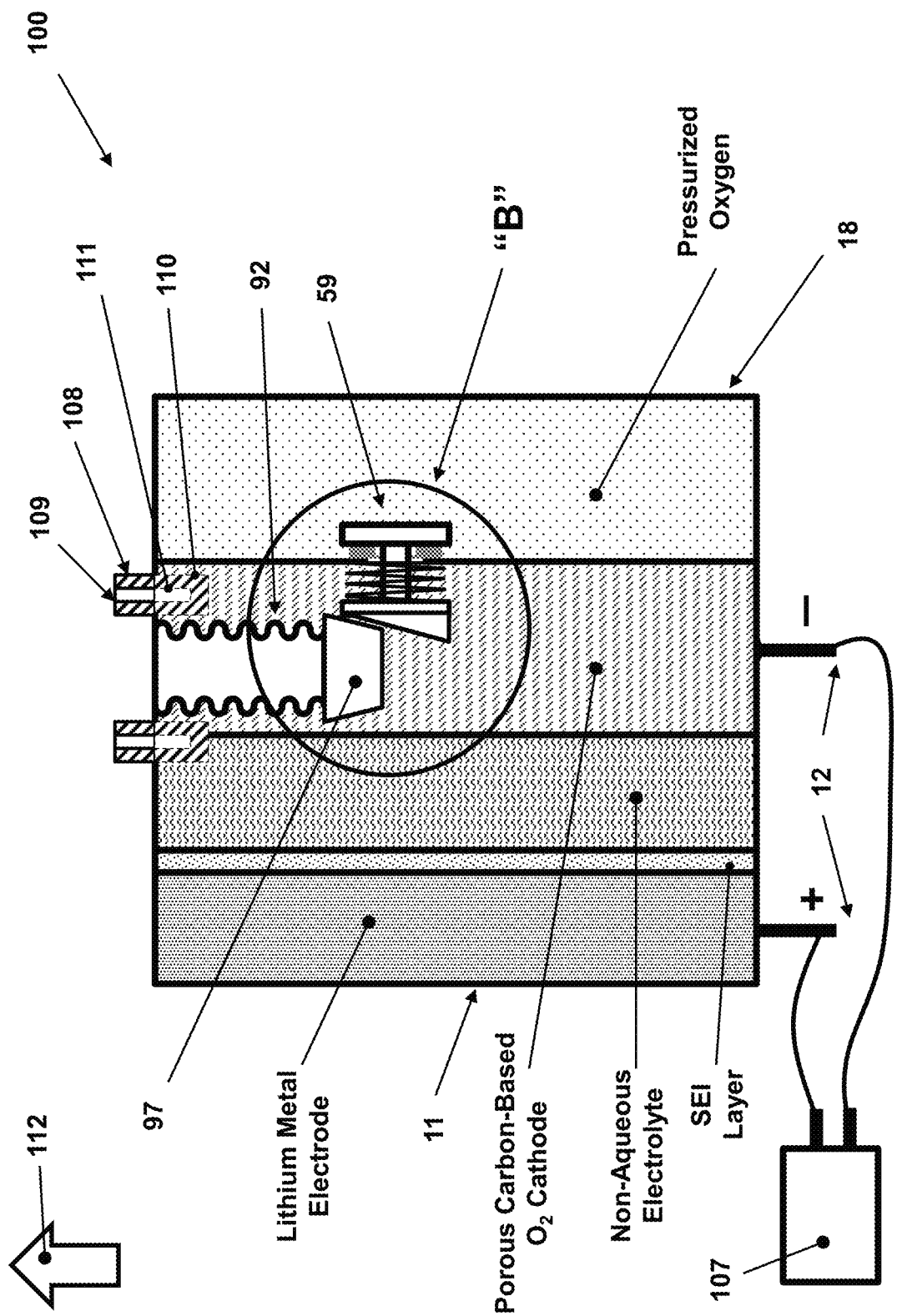
FIG. 12 illustrates a cross-sectional view of another embodiment of Lithium-oxygen reserve battery configured for user mounted activation/deactivation on command.

The Lithium-oxygen reserve battery embodiment 90 of FIG. 11 is configured to be activated either during the munitions firing for a short period of time and then by the integrated actuation device or directly by the integrated actuation device, in this case the linear solenoid 95. The Lithium-oxygen reserve battery embodiment 90 may also be constructed without the electrical actuator as shown in the schematic of FIG. 12 (indicated as the embodiment 100) and instead be provided with at least a pair of bosses 108 with (interior or exterior) threads 109 on the outside surface of the battery housing or those 110 with internal threads, for the used to attach the desired actuation device (linear or screw type rotary electrical or piezoelectric-based linear actuator or the like). In both options, the bosses are fixedly attached to the battery housing surface, such as by welding or brazing or the like and fully sealed to keep the battery core hermetically sealed for long shelf life. The Lithium-oxygen reserve battery embodiment 100 operates as was previously described for the reserve battery embodiment 90 of FIG. 11.

In the schematic of FIG. 13A, the blow-up view "B", FIG. 12, showing the valve 59 and the actuating conical mass section 97 and the bellow 92 is redrawn. In an alternative configuration, the valve 59 may be replaced with the configuration shown in the embodiment 60 of FIG. 9. With the replaced valve, the blow-up view "B" would then become as shown in FIG. 13B.

Then in the normal conditions, as was described for the embodiment of FIG. 9, the preloaded compressive spring 115 and the pressurized oxygen gas in the container 18 keep the valve closed and prevent oxygen gas from entering the porous carbon-based $O_2$ cathode of the battery core, FIG. 12. Then if the device to which the reserve battery 100 is attached is accelerated in the direction of the arrow 112, the acceleration would act on the inertia of the mass member 97, generating a downward dynamic force. The compressive spring 115 is preloaded such that when the acceleration in the direction of the arrow 112 has reached a prescribed threshold, then the generated dynamic force would overcome the spring preload and the mass member 97 begin to move downward as viewed in FIG. 12. Here, the spring rate of the metal bellow is considered to be negligible, otherwise it must also be considered. If the acceleration in the direction of the arrow 112 is long enough in duration, the cap 116 is moved to the right enough to allow the pressurized oxygen gas to begin to flow into the porous carbon-based $O_2$ cathode section of the battery core and activate the reserve battery. Once the cap 116 has moved to the right, the gap between the bottom surface of the cap 116 and the surface 119 of the container 18 is configured to be enough to allow the "locking" member 121 to be pushed under the cap 116 and prevent the cap to close the flow of the oxygen gas into the battery core once the acceleration in the direction of the arrow 112 has ceased. Thereby, the reserve battery is activated and stays activated after the acceleration event, for example due to the firing of a munition in which the reserve battery is mounted. If the applied acceleration in the direction of the arrow 112 is below the prescribed threshold, for example due to accidental drop of the object to which the reserve battery 100 is attached, the valve stays closed and the reserve battery is not activated.

Figure 13C:
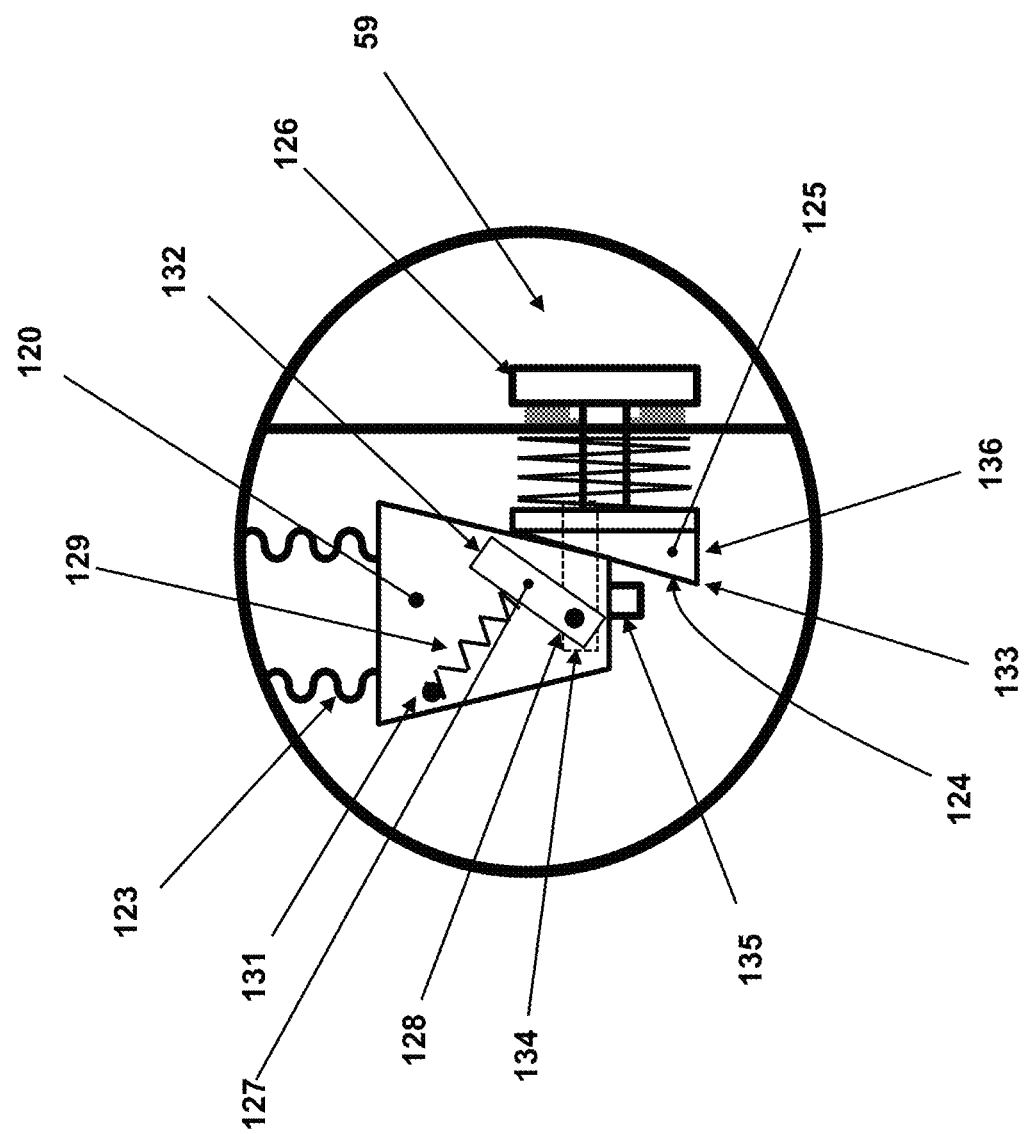
FIG. 13C illustrates an alternative oxygen gas valve for the Lithium-oxygen reserve battery embodiment blow-up "B" of FIG. 12 configured for activation when subjected to a prescribed acceleration profile and be activated and deactivated and/or stay activated on command.

In an alternative configuration of FIG. 13B, once the valve (59 in FIG. 12) is opened due to the prescribed acceleration event, the valve stays open and the reserve battery 100 stays activated from then on. On the other hand, the valve configuration shown in FIG. 12 and its blow-up view of FIG. 13A provides a reserve battery that requires activation of its electrical actuation device (e.g., a linear electrical solenoid) to open the valve 59 to reactivate the reserve battery after its initial inertial (or direct solenoid operated electrical) activation. In this embodiment, to keep the battery permanently activated after cycles of activation/deactivation, the actuation mechanism needs to be kept energized. To avoid the waste of electrical energy to keep the actuation device energized, the modification shown in the blow-up schematic of FIG. 13C is made to the activation mechanism of the reserve battery.

In the activation mechanism of FIG. 13C, the same valve 59 of the embodiment 100 of FIG. 12 is used. The conical section mass member 120 (97 in FIG. 13B) is similarly fixedly attached to the bellow 123 (92 in FIG. 13B). The conical section mass member 120 is also positioned close or in contact with the sloped surface 124 of the member 125 (113 in FIG. 13B) of the normally closed valve 59 as can also be seen in FIG. 13B. The actuation mechanism that is provided for the reserve battery activation (for example, the linear solenoid 95 of FIG. 11 or other linear or rotary electrical actuator or the like) is provided with a proper return spring so that while it is not energized, the mass member 120 is at the position shown in FIG. 13C and does not force the valve 59 to open.

The mass member 120 is also provided with a link member 127, which is attached to the mass member 120 by a pin joint 128. The link member 127 is provided by a preloaded compressive spring 129, which is attached to the mass member 129 by the pin joint 131 and is biased to rotate the link member 127 in the clockwise direction as viewed in FIG. 13C and mostly rest against the surface 124 of the member 125.

Then in the normal conditions, as was described for the embodiment of FIG. 9, the preloaded compressive spring 115 (FIG. 13B) and the pressurized oxygen gas in the container 18 keep the valve closed and prevent oxygen gas from entering the porous carbon-based $O_2$ cathode of the battery core, FIG. 12. Then if the device to which the reserve battery 100 is attached is accelerated in the direction of the arrow 112, the acceleration would act on the inertia of the mass member 120, FIG. 13C, generating a downward dynamic force. The compressive spring (115 in FIG. 13b) of the valve 59 is preloaded such that when the acceleration in the direction of the arrow 112 has reached a prescribed threshold, then the generated dynamic force would overcome the spring preload and the mass member 120 begins to move downward as viewed in FIG. 13C. Here, the spring rate of the metal bellow is considered to be negligible, otherwise it must also be considered. If the acceleration in the direction of the arrow 112 is long enough in duration, the cap 126 is moved to the right, allowing the pressurized oxygen gas to begin to flow into the porous carbon-based $O_2$ cathode section of the battery core and activate the reserve battery. It is noted that the actuation device of FIG. 13C is configured such that the above prescribed acceleration profiles would not move the mass member 120 down enough along the surface 124 to have the tip 132 of the link member 127 to pass the tip 133 of the member 125 as can be seen in FIG. 13C.

The Lithium-oxygen reserve battery embodiment 100 of FIG. 12 is configured to be activated either during the munitions firing for a short period of time and then by the integrated actuation device (such as the linear actuator 95 as shown in FIG. 11) or directly by the integrated actuation device 95. The Lithium-oxygen reserve battery embodiment 100 may then be activated and deactivated on command by the indicated integrated actuation device. However, during each activation process, the integrated actuation device of FIG. 13C advances the mass member 120 down along the surface 124 such that the tip 132 of the link member 127 would not pass the tip 133 of the member 125, so that the integrated actuation device could be commanded to bring the mass member 120 back to its position shown in FIG. 13C, thereby closing the flow of oxygen gas into the battery core and reverting the battery to its reserve state.

However, at any moment, the integrated actuation device can be used to displace the mass member down enough so that the tip 132 of the link member 127 would clear the tip 133 of the member 125, thereby the link member 127 would rotate in the clockwise direction until it is stopped by the stop member 135 of the mass member 120. As a result, once the integrated actuation device is de-energized, the link 132 engages the lower surface 136 of the member 125 and prevents the mass member 120 from returning to its position shown in FIG. 13C. In the meanwhile, the opened valve 59 would stay open and the oxygen gas would continue flowing into the reserve battery core.

The Lithium-oxygen reserve battery embodiment 10 of FIG. 3 was shown to be configured to activate when subjected to a prescribed acceleration profile in the direction of the arrow 22. The reserve battery embodiment 10 may, however, be modified so that it could be activated by electrical initiation of a pyrotechnic charge, i.e., using an electrical initiator. Such a Lithium-oxygen reserve battery embodiment 130 is shown in the cross-sectional schematic of FIG. 14.

Figure 14:
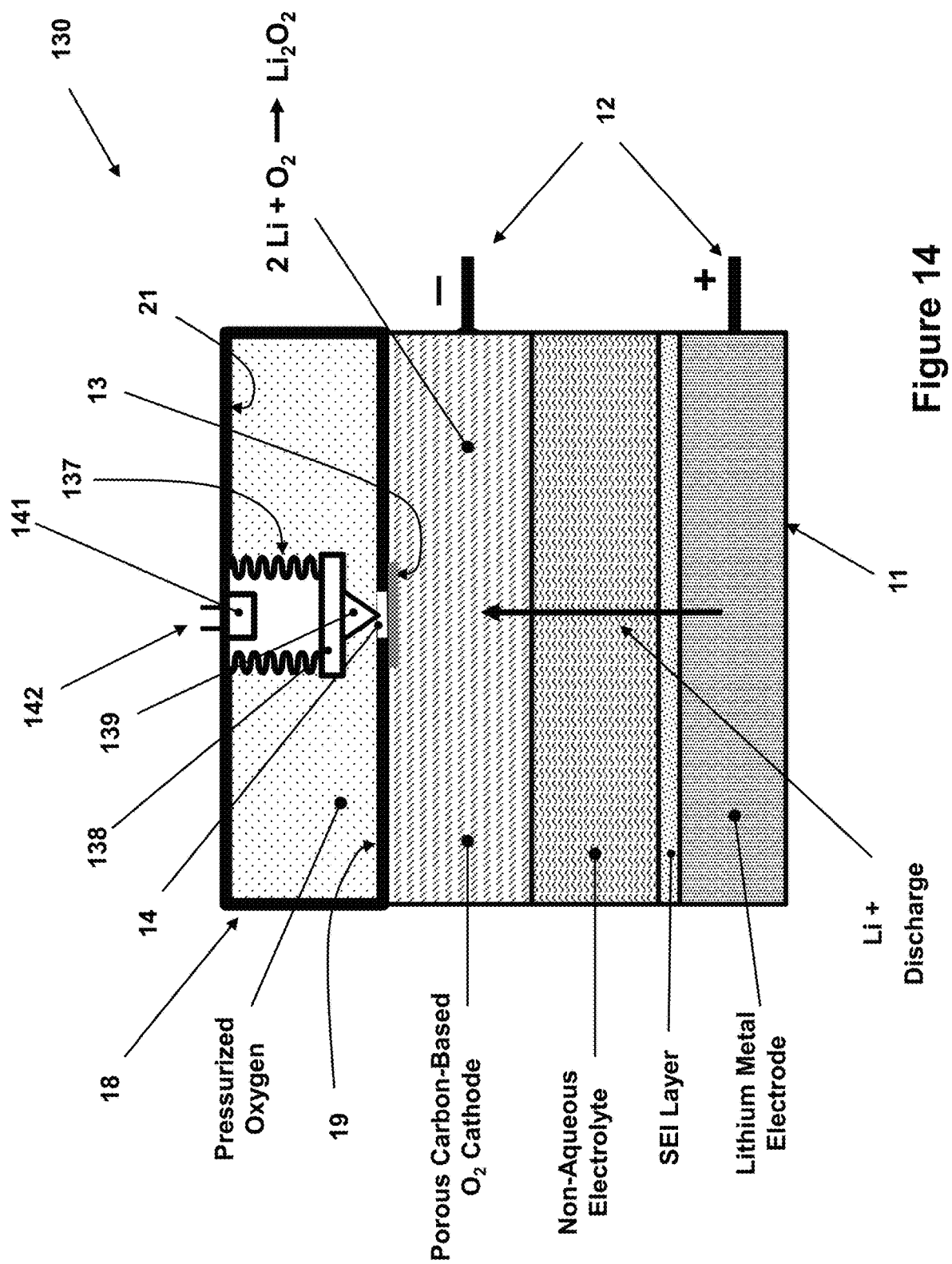
FIG. 14 illustrates a cross-sectional view of another embodiment of Lithium-oxygen reserve battery configured for activation by initiation of a pyrotechnic charge that is ignited electrically.

In the Lithium-oxygen reserve battery embodiment 130 of FIG. 14, the activation mechanism comprises a metallic bellow 137 that is fixedly attached to the surface 21 of the pressurized oxygen container 18, such as by welding or brazing. An end member 138 is also attached to the other end of the bellow, such as by welding or brazing. The attachments of the bellow to the surface 21 and the end member 138 must be sealed and the bellow 137 and end member 138 can be formed from the same material as the container 18, such as stainless steel. An electrically initiated gas generating pyrotechnic device 141 is provided inside the sealed bellow 137. Initiator service wires 141 are indicated by the numeral 142 in FIG. 14.

The common wall 19 between the container 18 and the battery core (inside housing 11) is provided with a relatively small opening 14 into the battery core, which is normally sealed by a metallic diaphragm 13. In general, the housings 11 and 18 are made with stainless steel and the diaphragm 13 is also a thin stainless sheet that is welded to the wall 19. The end member 138 is provided with a sharp cutting member 139, which is positioned above the hole 14.

The Li-Oxygen reserve battery embodiment 130 operates as follows. In normal conditions, the diaphragm 13 prevents oxygen gas from entering the porous carbon-based $O_2$ cathode of the battery core. Then if the electrical gas generating pyrotechnic device 141 is initiated, the pressure due to the generated gas would extend the bellow 137, thereby causing the end member 138 to move down and for the sharp cutting member 139 to reach and rupture the diaphragm 13, thereby allowing the oxygen gas to begin to flow into the porous carbon-based $O_2$ cathode section of the battery core and activate the reserve battery.

It is appreciated by those skilled in the art that the activation mechanisms such as the externally actuated manual or powered actuation activation mechanisms of the embodiments of FIGS. 5, 6, 7, 10, 11 and 12 may be configured with other types of mechanisms and powered actuators but to perform the same intended functions. The mechanisms and their actuation devices shown and described are primarily intended to describe the basic methods of activating the present Lithium-Oxygen reserve batteries and examples of mechanisms that can be used to activate them for continuous use or for multiple activation/deactivation. For example, the activation mechanism of the embodiment 50 of FIG. 7 may be readily modified for manual operation as shown in the embodiment 150 of FIG. 15 or by externally powered actuation devices as described below.

Figure 15:
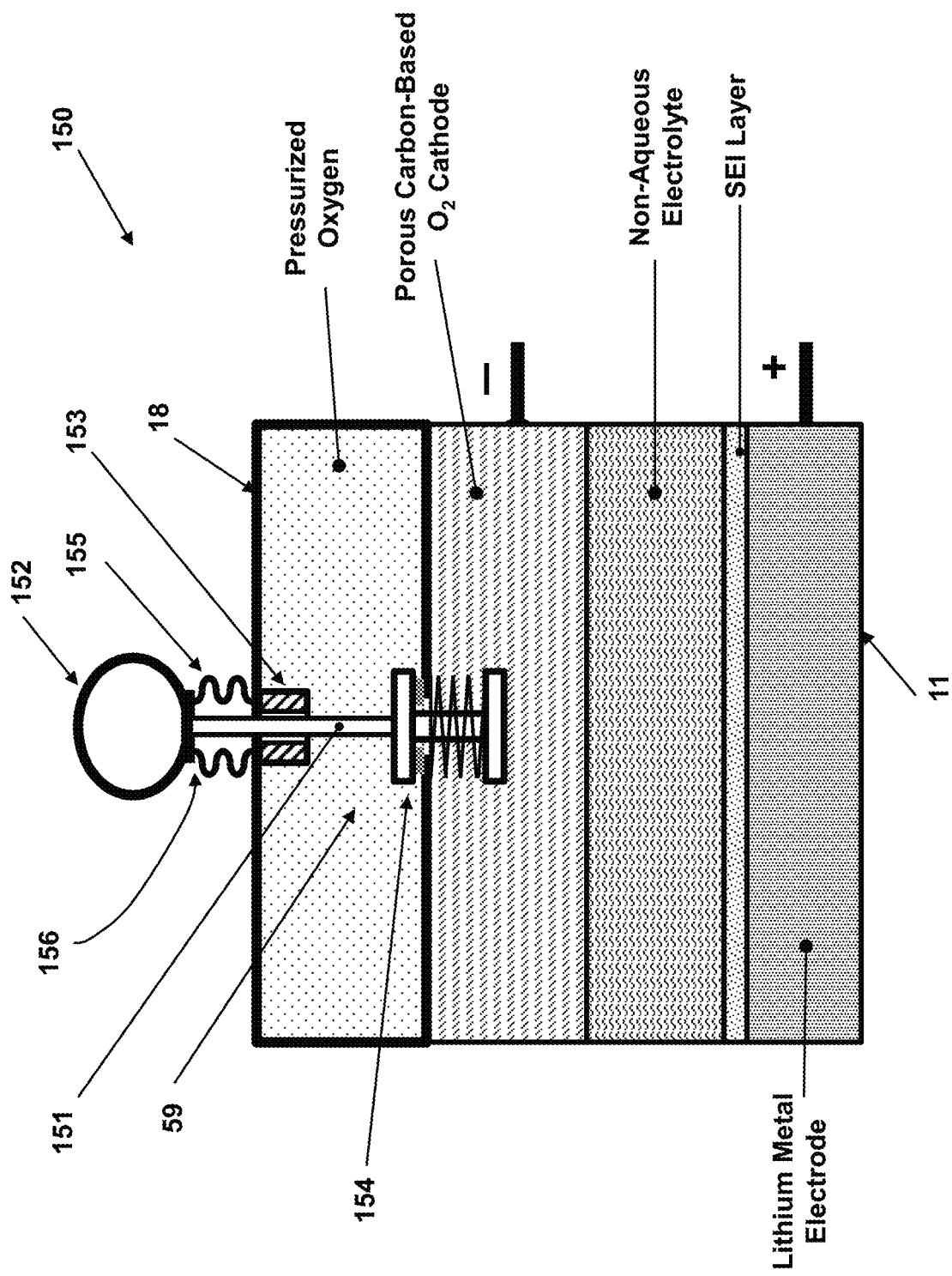
FIG. 15 illustrates a cross-sectional view of an example of a modified activation mechanism for the embodiment of FIG. 7.

In the Li-Oxygen reserve battery embodiment 150 of FIG. 15, the valve assembly 59, FIG. 7, is still used and may be positioned more centrally as shown in FIG. 15. However, since its sloped section 57 is no longer needed, it is eliminated as can be seen in the schematic of FIG. 15. The bellow-based actuation mechanism of the embodiment 50 of FIG. 7 is then modified and repositioned as follows. The mechanism bellow 155 is similarly attached to the outer surface of the oxygen container 18, such as by welding or brazing. The bellow 155 is then provided with a cap 156, which seals the bellow 155 and is attached to it, such as by welding or brazing. The guide 153 is similarly attached to the interior surface of the container 18 against the bellow 155. A pin 151 is provided as shown in FIG. 15, which can freely slide in the guide 153 and is fixedly attached to the cap 156 on one end and to the valve assembly 59 cap 154 on the other end. A ring or the like member 152 is also fixedly attached to the cap 156 for manual activation of the reserve battery.

The Li-Oxygen reserve battery embodiment 150 of FIG. 15 operates as follows. In normal conditions, the valve 59 is closed and prevents oxygen gas from entering the porous carbon-based $O_2$ cathode of the battery core. The reserve battery 150 is therefore in its inactive state and provides a long shelf life that can significantly exceed the military required 20 years. The user may then manually pull the ring 152, thereby pulling the pin 151 up and lifting the cap 154 from over the elastomeric sealing gasket (63 in FIG. 7), thereby allowing the oxygen gas to begin to flow into the porous carbon-based $O_2$ cathode section of the battery core and activate the reserve battery. Then when the user releases the ring 152, the extended bellow 155 would tend to spring back and assisted with the compressed oxygen gas pressure acting on the cap 154 would close the valve 59 and stop transfer of pressurized gas into porous carbon-based $O_2$ cathode section of the battery core. The battery is thereby reverted to its reserve state and the battery core would stop generating electrical energy once its present oxygen gas has been consumed.

It is appreciated by those skilled in the art that the cap 156 of the bellow 155, FIG. 15, may also be displaced up and down, as viewed in FIG. 15, by an externally positioned linear or rotary electrical or piezoelectric-based or pneumatic or the like actuation device as was described, for example, for the embodiment 70 of FIG. 10, on commands provided by the system controls as is well known in the art.

The Lithium-Oxygen reserve battery embodiments 10 and 20 of FIGS. 3 and 4, respectively, are configured to be activated when the device to which they are attached is subjected to a prescribed acceleration profile, such as firing of a gun. In many munition applications, such as in rockets, the reserve battery is required to be activated at prescribed accelerations that are low in magnitude, for example in tens of Gs rather than thousands in the case of gun-fired munitions, and lasts a few tens of milliseconds. In such applications, the activation mechanisms of the embodiments 10 and 20 of FIGS. 3 and 4, respectively, may not be suitable since they may require very large inertial mass (16 and 27 in FIGS. 3 and 4, respectively) to make them capable of rupturing the provided diaphragms to activate the reserve battery. The activation mechanism of the Lithium-Oxygen reserve battery embodiment 160 of FIG. 16 is configured for such relatively low G prescribed firing accelerations or the like applications.

Figure 16:
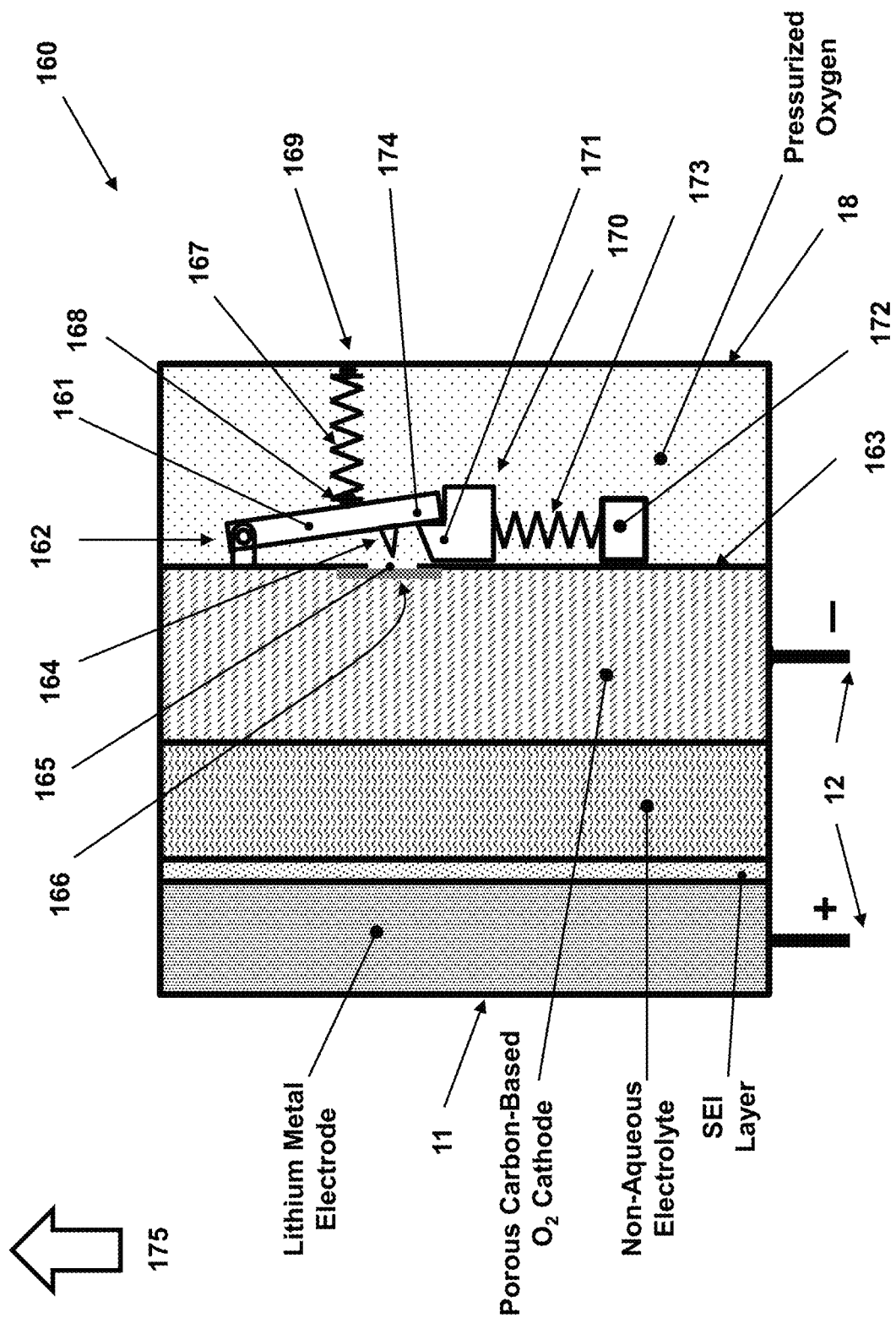
FIG. 16 illustrates a cross-sectional view of another embodiment of Lithium-oxygen reserve battery configured for activation when subjected to a prescribed acceleration profile.

In the schematic of FIG. 16, all other components of the reserve battery are similar to that of the embodiment 10 of FIG. 3, except for its inertial activation mechanism. As can be seen in FIG. 16, the Lithium-Oxygen reserve battery embodiment 160 is provided with an activation mechanism that comprises a link 161, which is attached to the surface 163 of the pressurized oxygen container by the rotary joint 162. In normal conditions the link 161 is in the configuration shown in FIG. 16, in which the tip 174 of the link rests on provided "step" on the tip 171 of the inertial mass 170. In this configuration, the inertial mass 170 is being pushed against the tip 174 of the link 161 by the preloaded compressive spring 173. The preloaded compressive spring 173 is positioned between the inertial mass 170 and the support 172, which is fixedly attached to the surface 163 of the pressurized oxygen container. The link 161 is also held in its position shown in FIG. 16 by the preloaded compressive spring 167, which is attached to the link 161 by the pin joint 168 on one end and to the inside of the pressurized oxygen container by the pin joint 169 on the other end. The link 161 is also provided with a sharp cutting member 164, which in the normal condition of FIG. 16 is positioned above the hole 165 in the side 163 of the pressurized oxygen container that is covered by the diaphragm 166, which can be metallic and attached to the container surface by welding or brazing.

The Li-Oxygen reserve battery embodiment 160 of FIG. 16 operates as follows. In normal conditions, the diaphragm 166 prevents oxygen gas from entering the porous carbon-based $O_2$ cathode of the battery core. If the device to which the reserve battery 160 is attached is accelerated in the direction of the arrow 175, the acceleration would act on the inertial mass 170, generating a downward dynamic force. The compressive spring 173 is preloaded such that when the acceleration in the direction of the arrow 175 has reached a prescribed threshold, then the generated dynamic force would overcome the spring preload and the inertial mass 170 would begin to move downward as viewed in FIG. 16. If the acceleration in the direction of the arrow 175 is long enough in duration, the inertial mass 170 moves down enough so that the tip 171 clears the tip 174 of the link 161. The preloaded compressive spring 167 will then accelerate the link 161 in rotation in the clockwise direction until the sharp cutting member 164 strikes the diaphragm 166 and causes it to rupture, thereby allowing the oxygen gas to begin to flow into the porous carbon-based $O_2$ cathode section of the battery core and activate the reserve battery. If the duration of the applied acceleration in the direction of the arrow 175 is very short, for example due to accidental drop of the object to which the reserve battery 160 is attached, the inertial mass 170 and spring 173 system is configured such that the link 161 is not released and thereby the reserve battery is not activated.

In various embodiments disclosed above, for any components described as being movable within the porous carbon-based $O_2$ cathode, the porous carbon-based $O_2$ cathode is configured to permit such movement, such as having a corresponding void.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A metal-gas battery comprising:
    a battery core comprising:
        a metal anode;
        a non-aqueous electrolyte;
        a porous cathode; and
        terminals for providing electrical power from the battery core;
    a container configured to hold a pressurized gas; and
    a member configured to be movable from a non-activated position in which the pressurized gas in the container is sealed from entering the porous cathode and an activated position in which the pressurized gas flows into the porous cathode to activate the battery core.

2. The metal-gas battery of claim 1, wherein the battery core comprises a housing for hermetically sealing the metal anode, non-aqueous electrolyte and porous cathode therein.

3. The metal-gas battery of claim 2, wherein:
    the housing having a hole providing fluid communication between the housing and the container;
    a diaphragm sealingly closing the hole; and
    the member has a portion configured to rupture the diaphragm when moved to the activated position;
    wherein the member is biased in the non-activated position.

4. The metal-gas battery of claim 3, wherein the member is configured to move to the activated position when the member experiences a predetermined acceleration profile.

5. The metal-gas battery of claim 3, wherein the member is configured to move to the activated position when the member is moved to the activated position by an applied force.

6. The metal-gas battery of claim 5, wherein:
    the member includes an extending portion; and
    a bellows sealingly covers the extended portion, the bellows at least partially biasing the member in the non-activated position.

7. The metal-gas battery of claim 2, wherein:
    the housing having a hole providing fluid communication between the housing and the container;
    the member has a first portion configured to seal the hole when in the non-activated position, the member having a second portion connected to the first portion through the hole;
    a spring for biasing the second portion away from the hole such that the first portion sealingly engages the hole when the member is in the non-activated position.

8. The metal-gas battery of claim 7, wherein at least the second portion and spring are configured to move the member to the activated position when the member experiences a predetermined acceleration profile.

9. The metal-gas battery of claim 8, further comprising another member configured to be movable when the member moves into the activated position to prevent the member from moving back into the non-activated position.

10. The metal-gas battery of claim 1, further comprising an activation device configured to move the member to the activated position, the activation device providing a force to move the member to the activated position.

11. The metal-gas battery of claim 10, further comprising an energy storage device configured to receive at least a partial amount of energy generated by the battery core after the member is moved to the activated state, the energy storage device at least partially providing the received energy to operate the actuation device to selectively move the member between the non-actuated and actuated positions.

12. The metal-gas battery of claim 11, wherein the energy storage device is under the control of a controller.

13. The metal-gas battery of claim 1, further comprising a spring for biasing the member in the non-activated position.

14. The metal-gas battery of claim 1, wherein the member is provided at least partially in the container.

15. The metal-gas battery of claim 1, wherein the member is provided at least partially in the porous cathode.

16. The metal-gas battery of claim 1, wherein the member moves in translation from the non-activated position to the activated position.

17. The metal-gas battery of claim 1, wherein the member moves in rotation from the non-activated position to the activated position.

18. The metal-gas battery of claim 1, further comprising an obstruction member for obstructing the movement of the member from the non-activated position to the activated position, wherein the obstructing member is configured to be manually removed to allow movement of the member from the non-activated position to the activated position.

19. The metal-gas battery of claim 1, further comprising an other member configured to prevent movement of the member to the non-activated position after achieving the activated position.

20. The metal gas battery of claim 1, wherein the member is configured to selectively move from the activated position to the non-activated position.

21. The metal-gas battery of claim 1, wherein the metal anode is lithium.

22. The metal-gas battery of claim 1, wherein the pressurized gas is oxygen or a gas containing oxygen.

23. The metal-gas battery of claim 22, wherein the porous cathode is a porous carbon-based cathode.

* * * * *